(12) United States Patent
Meng et al.

(10) Patent No.: US 12,458,166 B1
(45) Date of Patent: Nov. 4, 2025

(54) TELESCOPIC CONTAINER ASSEMBLY AND COFFEE MACHINE

(71) Applicant: YearWeekDaily Limited, Tortola (VG)

(72) Inventors: RunRong Meng, Tortola (VG); QingXian Xu, Tortola (VG); Kong Zhang, Tortola (VG); WeiWei Shi, Tortola (VG); HongTao Wang, Tortola (VG); WenYu Zhou, Tortola (VG)

(73) Assignee: TANZHEXINGJI (SHANGHAI) NETWORK TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 19/059,310

(22) Filed: Feb. 21, 2025

(30) Foreign Application Priority Data

Jan. 2, 2025 (CN) .......................... 202520007684.1
Jan. 14, 2025 (CN) .......................... 202520090421.1

(51) Int. Cl.
*A47J 31/00* (2006.01)
*A47J 31/36* (2006.01)
*A47J 31/44* (2006.01)

(52) U.S. Cl.
CPC ......... *A47J 31/4403* (2013.01); *A47J 31/005* (2013.01); *A47J 31/3628* (2013.01); *A47J 31/3695* (2013.01)

(58) Field of Classification Search
CPC .. A47J 31/005; A47J 31/3609; A47J 31/3623; A47J 31/3671; A47J 31/3676; A47J 31/3628; A47J 31/3695
See application file for complete search history.

(56) References Cited

U.S. PATENT DOCUMENTS

| | | | | |
|---|---|---|---|---|
| 881,562 | A | * | 3/1908 | Ellis .................... A47J 31/20 |
| 5,880,441 | A | * | 3/1999 | Hartman ............... A47J 31/547 |
| | | | | 219/689 |
| 6,561,080 | B1 | * | 5/2003 | Feeney .................. A47J 31/24 |
| | | | | 99/295 |

(Continued)

FOREIGN PATENT DOCUMENTS

| | | |
|---|---|---|
| CN | 205458091 U | 8/2016 |
| CN | 209863405 U | 12/2019 |

(Continued)

OTHER PUBLICATIONS

The extended European search report of EP patent application No. 25160768.5 issued on Aug. 27, 2025.

*Primary Examiner* — Reginald Alexander
(74) *Attorney, Agent, or Firm* — Andrew C. Cheng

(57) ABSTRACT

The present utility model relates to the technical field of coffee machines, and specifically discloses a telescopic container assembly and a coffee machine. The assembly comprises a mounting bracket and a cup, with the cup sleeved on the outer side of the mounting bracket. A receiving space for accommodating liquid is formed between the cup and the mounting bracket, and an adjustment component is arranged between the mounting bracket and the cup for enlarging or reducing the receiving space. Through the provision of the adjustment component, the receiving space can be increased or decreased, allowing the size of the receiving space to be flexibly adjusted as needed. Moreover, when not in use, the receiving space can be reduced, making the device easier to carry.

19 Claims, 16 Drawing Sheets

(56) References Cited

U.S. PATENT DOCUMENTS

| | | | |
|---|---|---|---|
| 10,674,862 B1 * | 6/2020 | Johnson | A47J 31/446 |
| 12,048,391 B1 | 7/2024 | Sa | |
| 2009/0229472 A1 * | 9/2009 | Ferrara, Jr. | A47J 31/18 |
| | | | 99/323 |
| 2022/0061579 A1 * | 3/2022 | Rivera | A47J 31/0636 |

FOREIGN PATENT DOCUMENTS

| | | | | |
|---|---|---|---|---|
| CN | 114788639 A | * | 7/2022 | A47J 31/005 |
| KR | 20210003634 A | | 1/2021 | |
| WO | 2018107627 A1 | | 6/2018 | |

* cited by examiner

TELESCOPIC CONTAINER ASSEMBLY AND COFFEE MACHINE

CROSS-REFERENCE TO RELATED APPLICATIONS

This application is based upon and claims priority to Chinese Application No. 2025200076841, filed on Jan. 2, 2025, Chinese Application No. 2025200904211, filed on Jan. 14, 2025, the contents of which are incorporated herein by reference in its entirety.

TECHNICAL FIELD

The present utility model relates to the technical field of coffee machines, and in particular to a telescopic container assembly and a coffee machine.

BACKGROUND TECHNOLOGY

A coffee machine is a device used for brewing coffee. For instance, as described in the invention with US202310563935X, the coffee machine includes a cup body in which components such as a power source and a circuit board are installed. One end of the cup body is provided with a heating area, while the other end is provided with an extraction area. The extraction area is connected to the cup body via a mounting bracket, and a cup is arranged on the outside of the extraction area for receiving the extracted coffee. The cup is connected to the mounting bracket and is positioned in a fixed, non-movable manner, making it impossible to adjust the cup flexibly based on actual needs. Consequently, when receiving coffee liquid or coffee grounds, the capacity of the container space cannot be optimized effectively. Moreover, the overall size of the device cannot be compressed when not in use, causing the device to occupy considerable space and reducing its portability and ease of storage.

SUMMARY OF THE INVENTION

The objective of the present utility model is to provide a telescopic container assembly and a coffee machine. By arranging an adjustment component, the receiving space can be enlarged or reduced, so that the capacity of the receiving space can be adjusted as needed. Consequently, it can be flexibly adapted to the situation at hand, and the receiving space can be reduced when not in use, facilitating portability. This addresses the problem that the position of the existing cup is fixed and cannot be flexibly adjusted.

The objective of the present utility model is achieved as follows:

A telescopic container assembly, comprising a mounting bracket and a cup. The cup is sleeved on the outside of the mounting bracket, with the receiving space for holding liquid formed between the cup and the mounting bracket. An adjustment component is arranged between the mounting bracket and the cup for enlarging or reducing the receiving space.

Preferably, the adjustment component includes a slot rail and a first slider. The slot rail is arranged on the outside of the mounting bracket, and the first slider is located on the inside of the cup. The first slider is located within the slot rail and moves along the slot rail, thereby adjusting the position of the cup to enlarge or reduce the receiving space;

or, the slot rail is arranged on the inside of the cup, and the first slider is located on the outside of the mounting bracket. The first slider is located within the slot rail and moves along the slot rail, thereby adjusting the position of the mounting bracket to enlarge or reduce the receiving space.

Preferably, there are at least two slot rails, each corresponding one-to-one to a first slider. Each slot rail comprises a first transverse section, a second transverse section, and a connecting section that connects the first and second transverse sections. The first slider can move back and forth between the two transverse sections along the connecting section to enlarge or reduce the receiving space.

Preferably, the slot rail is arranged on the outside of the mounting bracket, and the first slider is located on the inside of the cup. A first stopper is provided within the first transverse section, and the first slider is provided with a first engaging slot corresponding to the first stopper;

and/or, an included angle between the lower side of the first transverse section and the connecting section is greater than or equal to 90°;

and/or, an arc segment is provided between the upper side of the second transverse section and the connecting section, and adjacent second transverse sections are not in communication with one another.

Preferably, the cup is made of transparent or frosted material, so that the adjustment component can be seen;

and/or, a third sealing ring is provided between the mounting bracket and the cup, with a venting notch formed on the outer side of the third sealing ring.

The present utility model further provides a coffee machine, comprising a cup body with a main machine component disposed therein. One end of the cup body is provided with any one of the above telescopic container assemblies. The mounting bracket is arranged at one end of the cup body, and is ring-shaped. An extraction assembly is mounted on the inner side of the mounting bracket.

Preferably, the extraction assembly includes a water inlet seat and a base, where the water inlet seat may be a powder tank inlet seat and/or a capsule tank inlet seat. An extraction powder tank or an extraction capsule tank is formed respectively between the powder tank inlet seat or the capsule tank inlet seat and the base. When both the powder tank inlet seat and the capsule tank inlet seat exist, the two can be interchanged for use.

The present utility model also provides a capsule extraction assembly. The extraction assembly includes a capsule water inlet seat and a base, and an extraction capsule tank is formed between the capsule tank inlet seat and the base. A rupturing plate is arranged inside the extraction capsule tank and is arranged on the base. The capsule tank inlet seat forms a cavity that accommodates a coffee capsule. A piercing component is arranged on the upper side of the capsule tank inlet seat, and the capsule tank inlet seat cooperates with the base to clamp the edge of the capsule.

The present utility model further provides a piercing component, including a water inlet seat and a piercing needle. One preferred structure of the water inlet seat is that it includes a water inlet seat and a second mounting plate, with the piercing needle located between the water inlet seat and the second mounting plate. The water inlet seat is provided with multiple water inlet openings for water flow. The second mounting plate has a second cavity formed beneath the water inlet, and a second channel communicating with the second cavity is arranged therein. The bottom of the piercing needle is movably arranged inside the second channel, and the top of the piercing needle passes through and protrudes from the water inlet seat. The middle portion of the piercing needle is provided with a third channel for water flow, and a side opening is formed in the side wall of the piercing needle. The side opening serves to connect the second cavity and the third channel.

Preferably, a boss is provided under the second channel of the second mounting plate, and the boss is formed with a second through hole that communicates with the second channel. A spring is arranged between the boss and the piercing needle, and under the action of the spring, the bottom of the piercing needle is located in the second through hole.

Preferably, a stopper plate is arranged on the outside of the piercing needle, the spring is located between the bottom of the stopper plate and the boss, and the top of the stopper plate can contact the water inlet seat, thereby limiting the piercing needle's movement range.

Preferably, the first channel is formed by at least two third protruding plates arranged in an enclosure, and a gap is formed between every two adjacent third protruding plates;
and/or, the top of the water inlet seat has a first recess, and the bottom of the first recess is formed with a third through hole for the piercing needle to pass through. The outside of the third through hole in the first recess is formed with a water inlet.

Preferably, a fourth sealing ring is arranged between the inner side wall of the water inlet seat and the outer side wall of the second mounting plate;
and/or, a first baffle is arranged inside the water inlet seat, and the second mounting plate is provided with a support plate. The inner wall of the support plate encloses the second cavity, and the support plate is located inside the first baffle; a fifth sealing ring is arranged between the support plate and the water inlet seat.

The present utility model further provides an extraction structure that includes any of the above-described piercing components.

Preferably, the extraction structure includes a base and any of the above-mentioned piercing components, where the base is formed with a bearing cavity for placing the capsule, and the bottom of the base is formed with a liquid outlet. The top of the base is positioned inside the water inlet seat, and the second mounting plate is located between the base and the water inlet seat. The inner side wall of the water inlet seat is detachably connected to the outer side wall of the base.

Preferably, the connection between the inner side wall of the water inlet seat and the outer side wall of the base is a threaded connection;
or, a sliding slot is formed on the inner side wall of the water inlet seat, one side of the sliding slot is open, and a sixth engaging slot is formed inside the sliding slot. A second slider is arranged on the outer wall of the base, and the second slider enters the sliding slot via the opening and moves therein. A fifth protrusion is arranged on the second slider corresponding to the sixth engaging slot.

Preferably, a sixth sealing ring is arranged between the outer side wall of the base and the inner side wall of the water inlet seat;
and/or, a second connecting plate is arranged on the outer side of the capsule top, and a step is arranged on the inner side wall of the water inlet seat. The second connecting plate is located between the step and the base, and the bottom of the second mounting plate abuts against the second connecting plate.

The present utility model further provides a powder tank extraction assembly. The extraction assembly comprises a powder tank water inlet seat and a base, with an extraction powder tank formed between the powder tank inlet seat and the base. A powder tank outer bowl is arranged inside the extraction powder tank, and a powder bowl is arranged inside the powder tank outer bowl. The water inlet seat covers the powder bowl and cooperates with the powder tank outer bowl to clamp the powder bowl.

Preferably, when the water inlet seat is the powder tank water inlet seat, a pressing portion is provided on the outside of the water inlet seat. A plurality of filter holes are formed in the bottom of the powder bowl, and the bottom of the powder bowl is located inside the powder tank outer bowl, with a first sealing ring arranged between the powder bowl and the powder tank outer bowl. The first sealing ring is located outside the plurality of filter holes. A first connecting portion is arranged on the outer side of the top of the powder bowl. The first connecting portion is located between the pressing portion and the top of the powder tank outer bowl. A connecting slot is formed at the bottom of the first connecting portion corresponding to the top of the powder tank outer bowl.

Preferably, a first liquid outlet is arranged at the bottom of the powder tank outer bowl, and a first mounting slot is arranged on the inner bottom surface of the powder tank outer bowl on the outer side of the first liquid outlet. The first sealing ring is located within the first mounting slot. The first sealing ring includes a first main body and a first protrusion disposed on the top of the first main body. The first protrusion is located outside the plurality of filter holes and contacts the bottom of the powder bowl. Both the inner and outer sides of the first protrusion are inclined surfaces, and these inclined surfaces slope in the direction of the first liquid outlet.

Preferably, a first liquid outlet is formed at the bottom of the powder tank outer bowl, and a second liquid outlet is formed at the bottom of the base corresponding to the first liquid outlet. A first elastic member is arranged between the powder tank outer bowl and the base. A first plug is arranged on the first elastic member corresponding to the first liquid outlet. Under the action of the first elastic member, the top of the first plug is located in the first liquid outlet.

Preferably, a bottom cover is arranged between the powder tank outer bowl and the base, and an outlet is formed in the bottom cover corresponding to the first liquid outlet. The first elastic member is positioned between the bottom cover and the extraction tank, and the movement of the first plug can control whether the first liquid outlet communicates with the outlet. The bottom cover is formed with at least two placement slots. The first elastic member includes a second connecting portion and elastic pieces arranged on the outer side of the second connecting portion. The second connecting portion is arranged with the first plug corresponding to the first liquid outlet, and the elastic pieces are arranged at an angle. The ends of the elastic pieces far from the second connecting portion are located inside the placement slots.

Preferably, a first liquid outlet is formed at the bottom of the powder tank outer bowl, and a second liquid outlet is formed at the bottom of the base corresponding to the first liquid outlet. A second plug is arranged in the second liquid outlet. The second plug is formed with a first slit, which is in a closed state and opens under greater pressure.

Preferably, a second recess communicating with the first slit is formed on the top of the second plug, and an assembly portion is formed on the peripheral side of the second plug. The base is formed with an assembly slot corresponding to the assembly portion.

Preferably, the water inlet seat comprises a second main body and a pressing portion arranged on the outside of the top of the second main body. An inner wall of the extraction tank is provided with a second elastic member, and at least one protruding portion is arranged on the inner wall of the second elastic member. The protruding portion cooperates with the outside of the second main body to press against the powder bowl.

Preferably, a water inlet is formed in the water inlet seat for water flow, and a water inlet screen and an outlet screen are respectively arranged on the upper and lower sides of the water inlet seat near the water inlet.

The present utility model further provides a powder-receiving ring, which comprises an abutting portion and a second mounting portion arranged on the outside of the abutting portion. A third protrusion is formed on the inner side of the second mounting portion. A side wall of the first connecting portion outside the connecting slot is a lateral side, the bottom of the abutting portion contacts the top surface of the first connecting portion, and the top surface of the third protrusion fits with the bottom of that lateral side.

The present utility model further provides a folding spoon, which comprises a spoon body and a spoon handle rotatably arranged on the spoon body. The spoon body can be placed inside the powder bowl to compress the coffee grounds in the powder bowl.

The present utility model further provides a waterway sealing structure, comprising a mounting bracket and a water inlet seat. The mounting bracket is formed with a first passage for water flow, and the water inlet seat is formed with a water inlet. The mounting bracket is provided with a first sealing member on the side close to the water inlet seat. The mounting bracket is formed with a first mounting hole, and the first sealing member forms a seal between the first passage and the water inlet, and is used to seal the first mounting hole.

Preferably, a latch groove is formed on the outside of the first passage of the mounting bracket. The first sealing member is provided with a first latch block corresponding to the first mounting hole, and a first latching portion corresponding to the latch groove. A through hole is formed in the first sealing member corresponding to the first passage. A sealing surface is formed on the bottom of the first sealing member, which abuts against the water inlet seat and is located outside the water inlet to prevent water from flowing out.

The present utility model further provides a heating water cup, including a water cup main body, which can be used in the coffee machine described above.

Preferably, the other end of the cup body is provided with a heating area that includes a water cup main body and a lid. The lid comprises an outer lid and an inner lid arranged in an opening at the bottom of the outer lid. A fourth sealing member is arranged between the outer lid and the inner lid. The inner lid has an opening to expose the fourth sealing member. An exposed portion of the fourth sealing member is formed with a second slit, which opens under force. At least one first vent hole is formed on the top of the outer lid, and the first vent hole communicates with the inner side of the fourth sealing member.

Preferably, the cross-section of the second slit is V-shaped, and the V-shaped opening is formed on the side of the fourth sealing member facing the water cup main body.

Preferably, at least two second protruding plates are arranged on the inner side of the outer lid, and a flow-diverting opening is formed between each pair of adjacent second protruding plates;

and/or, a second baffle is arranged on the inner side of the outer lid, with the top of the second baffle located outside the first vent hole and the bottom of the second baffle abutting against the fourth sealing member.

Preferably, the fourth sealing member comprises an exposed portion and a third connecting portion located on the outer side of the exposed portion. The exposed portion is formed with the second slit. The inner lid has an opening that exposes the exposed portion, and the inner side of the inner lid is formed with a second mounting slot in which the third connecting portion is placed.

Preferably, a second baffle is arranged on the inner side of the outer lid, the third connecting portion is located between the second baffle and the second mounting slot, and a first protrusion is provided in the second mounting slot. The first protrusion forms an interference fit with the fourth sealing member.

Preferably, a heating plate is welded to the bottom or side wall of the water cup main body. The heating plate is made of metal and imprinted with heating wires, both ends of which are provided with connectors.

Preferably, a thermistor is welded to the heating plate.

Preferably, a latch is arranged on the inner wall of the outer lid, and a third engaging slot corresponding to the latch is formed on the outer side of the inner lid.

The present utility model further provides a portable coffee machine that includes the above heating water cup. An assembly bracket is arranged inside the cup body. The assembly bracket comprises a support and a first mounting plate arranged on the support. At least two insertion ports are provided on the first mounting plate, and at least two first connecting plates are provided on the outside of the water cup main body, with the bottom of each first connecting plate inserted into a respective insertion port.

Preferably, a fourth protrusion is arranged on the inner wall of each insertion port, and each first connecting plate is formed with a latch hole corresponding to the fourth protrusion;

and/or, a third circuit board is arranged between the support and the first mounting plate.

Preferably, at least one support block is arranged on the first mounting plate. The support block comprises a side plate and a spacer arranged on one side of the side plate. The spacer is located at the bottom of the water cup main body, and the side plate is in contact with the outside of the water cup main body.

Preferably, a heating plate is arranged between the water cup main body and the spacer.

The present utility model further provides a venting waterproof structure, wherein a charging assembly is arranged on one side of the cup body, and a waterproof venting element is arranged on the cup body to communicate the interior of the cup body with the outside so that the gas inside the cup body can be discharged.

Preferably, the charging assembly is located on the same side as the heating area, and the waterproof venting element is arranged on the charging assembly.

Optimally, the waterproof venting element is a waterproof breathable membrane, and the charging assembly is located on the same side as the heating area. The charging assembly includes a first circuit board, a mounting member, and a silicone cover. The mounting member is arranged on the cup body, and its inner and outer sides are connected to the first circuit board and the silicone cover, respectively. A charging connector is arranged on the first circuit board, and an opening is formed on the mounting member to expose the charging connector. A second vent hole is formed on the same side of the mounting member as the charging connector. A waterproof breathable membrane is arranged on the inner side of the mounting member, corresponding to the second vent hole.

Preferably, an insertion ring is arranged on the silicone cover corresponding to the charging connector;

and/or, a latching post is arranged on the inner side of the silicone cover, and a connecting hole is formed on the mounting member corresponding to the latching post. A second stopper is arranged on the outer side of the end of the latching post that passes through the connecting hole. The length and width of the stopper are both greater than those of the connecting hole, and the second stopper abuts against the inner side of the mounting member, thereby preventing the latching post from coming out of the connecting hole;

and/or, a hollow mounting column is arranged on the inner side of the mounting member, and a hole is formed on the first circuit board corresponding to the mounting column. A fastener passes through the hole and is screwed into the mounting column, thereby connecting the mounting member and the first circuit board;

and/or, a column is arranged on the mounting member, and the first circuit board is formed with an assembly hole corresponding to the column.

Preferably, a second mounting hole is formed on the cup body to accommodate the charging assembly. A sixth sealing ring is arranged between the inner wall of the second mounting hole and the outer side of the mounting member. A third protrusion is arranged on the inner wall of the second mounting hole. A latching plate is arranged on the inner side of the mounting member, and a third latch block is arranged on the outer side of the latching plate. One side of the third latch block, which is close to the mounting member, abuts against the third protrusion.

Preferably, a key assembly is arranged on one side of the cup body, and a second circuit board is arranged on the inside of the cup body corresponding to the key assembly. The key assembly includes a first light-transmitting member and a pressing plate arranged on the first light-transmitting member. A button is arranged on the second circuit board corresponding to the pressing plate. The first light-transmitting member is elastic and is secondarily injection-molded together with the cup body.

Preferably, a light-emitting element is arranged on the second circuit board, and a second light-transmitting member is arranged on the cup body corresponding to the light-emitting element. The second light-transmitting member is secondarily injection-molded with the cup body.

Preferably, a decorative ring is arranged on the outer side of the first light-transmitting member, and a protruding ring is arranged on the first light-transmitting member. A first protruding plate is arranged on the outer side of the protruding ring. The decorative ring is sleeved outside the protruding ring, and the first protruding plate is located between the decorative ring and the cup body;

and/or, the cup body is formed with a third glue-receiving groove on the outside of the first light-transmitting member, and the inner side of the decorative ring is located within the third glue-receiving groove.

Preferably, a protruding ring is arranged on the first light-transmitting member, and a first mounting portion is arranged on the inside of the protruding ring. A third mounting slot is formed on the inside of the pressing plate corresponding to the first mounting portion. The top of the first mounting portion is formed with a first glue-receiving groove, and a second glue-receiving groove is formed between the inner side wall of the protruding ring and the outer side wall of the first mounting portion.

Preferably, a first connector terminal is arranged on the first circuit board, and a third circuit board is arranged inside the cup body. A second connector terminal is arranged on the third circuit board, and the first connector terminal and the second connector terminal are connected via a wire.

The coffee machine provided by the present utility model can include one or more of the above structures: the telescopic container assembly, the capsule extraction assembly, the powder tank extraction assembly, the heating water cup, or the venting waterproof structure. It can also be an assembly integrating all of them.

Compared with the prior art, the present utility model has the following prominent and beneficial technical effects:

With the adjustment component, the capacity of the receiving space can be increased or decreased, so the size of the receiving space can be flexibly adjusted according to practical needs, and when not in use, the receiving space can be reduced for portability.

A preferred embodiment of the present utility model utilizes the arrangement of a powder bowl. Compared with plate-type filters, the installation of the powder bowl is more convenient. Once oriented correctly, it can be placed directly without repeated adjustments and be prevented from tilting. Moreover, the powder bowl itself will not easily move within the powder tank outer bowl. Meanwhile, the first sealing ring is located outside the plurality of filter holes, thus preventing water from flowing elsewhere.

Figure 1:
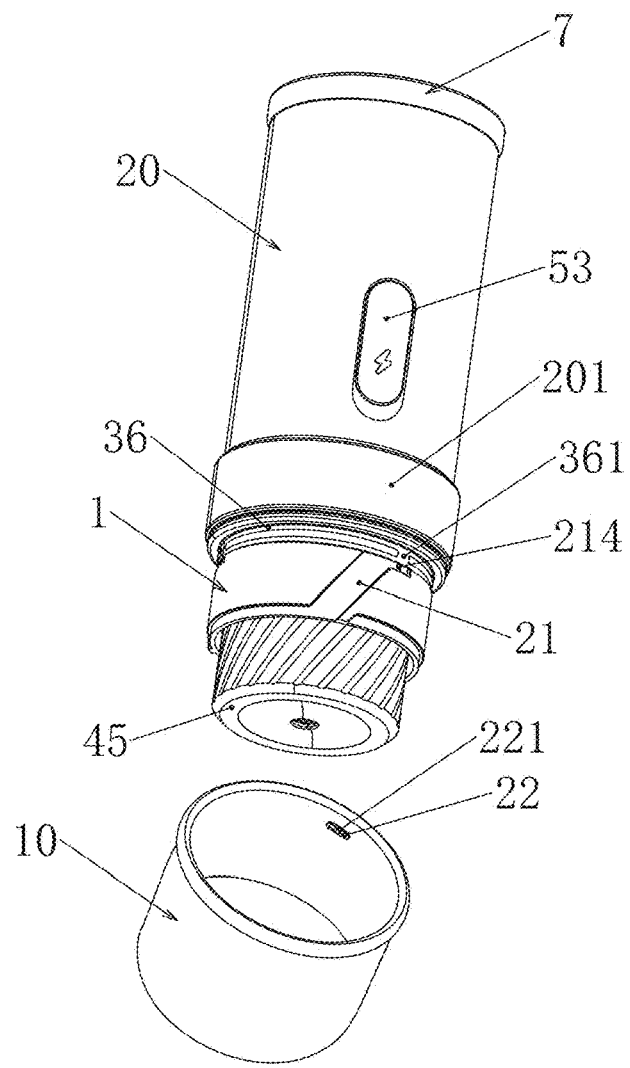
FIG. 1 is a structural schematic diagram of the coffee machine.
Figure 2:
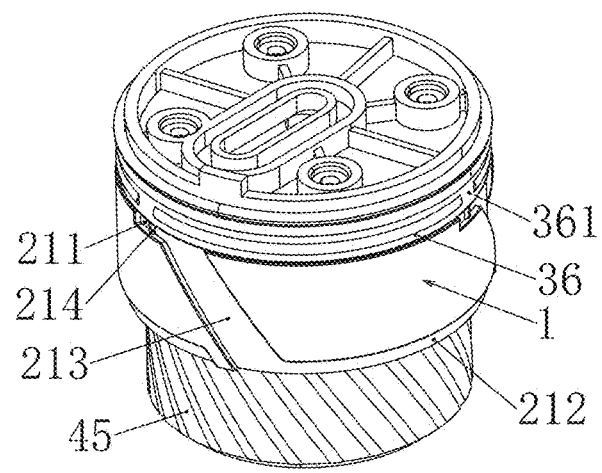
FIG. 2 is a structural schematic diagram of the mounting bracket and powder tank extraction assembly.

Reference Numerals: 1—Mounting bracket; 11—First passage; 12—First mounting hole; 13—Latch groove; 21—Slot rail; 211—First transverse section; 212—Second transverse section; 213—Connecting section; 214—First stopper; 22—First slider; 221—First engaging slot; 31—First sealing ring; 311—First main body; 312—First protrusion; 32—Second sealing member; 33—Third sealing member; 34—Second sealing ring; 35—First sealing member; 351—First latch block; 352—First latching portion; 353—First through hole; 36—Third sealing ring; 361—Notch; 37—Fifth sealing member; 41—Water inlet seat; 411—Pressing portion; 412—Water inlet; 413—Storage slot; 4131—First protrusion; 414—Second protrusion; 415—Support post; 416—First recess; 42—Powder tank outer bowl; 421—First liquid outlet; 422—First mounting slot; 43—Powder bowl; 431—First connecting portion; 4311—Connecting slot; 446—Piercing needle; 45—Base; 451—Second liquid outlet; 461—First elastic member; 4611—Second connecting portion; 4612—Elastic piece; 462—First plug; 4621—First latch block; 463—Bottom cover; 4631—Placement slot; 4632—Outlet; 464—Second plug; 4641—First slit; 4642—Second recess; 4643—Assembly portion; 47—Second elastic member; 471—Protruding portion; 481—Water inlet screen; 4811—Third engaging slot; 482—Outlet screen; 4821—First engaging hole; 49—Rupturing plate; 5—Charging assembly; 51—First circuit board; 511—Assembly hole; 512—Hole; 52—Mounting member; 521—Connecting hole; 522—Mounting column; 523—Latching plate; 524—Second latch block; 525—Column; 53—Silicone cover; 531—Insertion ring; 532—Latching post; 533—Second stopper; 54—Charging connector; 55—Second vent hole; 56—Waterproof breathable membrane; 57—First connector terminal; 6—Key assembly; 61—First light-transmitting member; 611—Protruding ring; 612—First protruding plate; 613—First mounting portion; 614—First glue-receiving groove; 615—Second glue-receiving groove; 62—Pressing plate; 621—Third mounting slot; 63—Second light-transmitting member; 64—Decorative ring; 7—Lid; 71—Outer lid; 711—First vent hole; 712—Second protruding plate; 713—Flow-diverting opening; 714—Second baffle; 715—Latch; 72—Inner lid; 721—Second mounting slot; 722—First protrusion; 723—Fourth engaging slot; 73—Fourth sealing member; 731—Second slit; 732—Exposed portion; 733—Third connecting portion; 81—Heating plate; 811—Heating wire; 812—Connector; 813—Thermistor; 82—Water cup main body; 821—First connecting plate; 822—Second latch hole; 9—Assembly bracket; 91—Support; 92—First mounting plate; 93—Insertion port; 94—Fourth protrusion; 95—Support block; 96—Side plate; 97—Spacer; 10—Cup; 20—Cup body; 201—Anti-slip ring; 30—Third circuit board; 301—Second connector terminal; 40—Second circuit board; 401—Button; 402—Light-emitting element; 50—Powder-receiving ring; 501—Abutting portion; 502—Second mounting portion; 503—Third protrusion; 60—Folding spoon; 601—Spoon body; 602—Spoon handle; 603—Third protrusion; 604—Second engaging slot; 605—Second protrusion; 606—Fifth engaging slot; 381—Fourth sealing ring; 382—Fifth sealing ring; 383—Sixth sealing ring; 417—Sliding slot; 4171—Sixth engaging slot; 418—First baffle; 44—Second mounting plate; 441—Second channel; 442—Third protruding plate; 443—Boss; 444—Second through hole; 445—Support plate; 4461—Third channel; 4462—Side opening; 4463—Stopper plate; 447—Spring; 452—Second slider; 4521—Fifth protrusion; 70—Capsule; 701—Second connecting plate.

DETAILED DESCRIPTION

Below is a more detailed explanation of specific embodiments of the present utility model, made in conjunction with the accompanying drawings.

Referring to FIG. 1, the coffee machine includes a cup body 20. One end of the cup body 20 is provided with a heating area, and the other end of the cup body 20 is provided with a mounting bracket 1. An extraction assembly is installed inside the mounting bracket 1, and a cup 10 is arranged on the outside of the mounting bracket 1. The cup 10 is used to hold coffee after extraction. A water pump is built into the cup body 20 so that water can be transferred from the heating area to the extraction assembly, and a main circuit board is also installed inside the cup body 20 to control the operation of each component. An anti-slip ring 201 can be fitted onto the outer side of the cup body 20 to facilitate handling and reduce the chance of slippage.

In an existing structure, the position of the cup 10 is generally fixed and non-adjustable. Therefore, this utility model provides an adjustment component that allows the cup 10 to move. Specifically, the telescopic container assembly includes the mounting bracket 1 and the cup 10, with the cup 10 sleeved on the outer side of the mounting bracket 1. Between the cup 10 and the mounting bracket 1 is a receiving space used for containing liquid, and an adjustment component is arranged between them for enlarging or reducing this receiving space.

Thus, during use, the adjustment component can enlarge or reduce the receiving space, making the capacity adjustable as needed. The space can also be reduced when not in use, facilitating portability. Additionally, such an adjustment component can be used not only with coffee machines but also with other types of beverage cups.

There are various possible structures for the adjustment component. One example is given here in which the adjustment component comprises a slot rail 21 and a first slider 22. By moving the first slider 22 along the slot rail 21, the position of the cup can be adjusted. The slot rail 21 and the first slider 22 can be placed either on the mounting bracket 1 or on the cup 10.

Hence, there are two configurations: The slot rail 21 is placed on the outer side of the mounting bracket 1, and the first slider 22 is placed on the inner side of the cup 10. The first slider 22 is located within the slot rail 21 and moves along it, thereby adjusting the position of the cup 10 to enlarge or reduce the receiving space.

Or, the slot rail 21 is placed on the inner side of the cup 10, and the first slider 22 is placed on the outer side of the mounting bracket 1. The first slider 22 is located within the slot rail 21 and moves along it, thereby adjusting the position of the mounting bracket 1 to enlarge or reduce the receiving space.

As shown in FIG. 1, a representative structure for the slot rail 21 and the first slider 22 is as follows: there are at least two slot rails 21, each of which corresponds to a first slider 22. Each slot rail 21 comprises a first transverse section 211, a second transverse section 212, and a connecting section 213 for connecting the first transverse section 211 to the second transverse section 212. During use, by moving the first slider 22 along the connecting section 213 back and forth between the two transverse sections, the receiving space can be enlarged or reduced.

Furthermore, other detailed structures are: taking the configuration where the slot rail 21 is on the outer side of the mounting bracket 1, while the first slider 22 is on the inner side of the cup 10, to illustrate, a first stopper 241 is arranged inside the first transverse section 211, and the first slider 22 is provided with a first engaging slot 221 corresponding to the first stopper 241. During use, the matching of the first stopper 241 with the first engaging slot 221 can limit the movement of the cup 10, thereby preventing its movement when not in use.

Moreover, the included angle between the lower side of the first transverse section 211 and the connecting section 213 is greater than or equal to 90°. The connecting section 213 can thus be a straight line, an inclined line, or even a spiral line.

Additionally, an arc segment is arranged between the upper side of the second transverse section 212 and the connecting section 213, and adjacent second transverse sections 212 are not in communication with each other. In practical use, the arc segment reduces friction and helps the first slider 22 abut the inner wall of the second transverse section 212 to confirm it has moved into position. The length of each second transverse section 212 is larger than the length of the first slider 22, but smaller than an equal subdivision of the circumference of the mounting bracket 1 or the cup 10, thereby ensuring that two adjacent second transverse sections 212 are not connected.

As shown in FIG. 1, for ease of use, the cup 10 is preferably made of a transparent or frosted material so that the adjustment component is visible and thus easier to operate. Additionally, a third sealing ring 36 is arranged between the mounting bracket 1 and the cup 10. A notch 361 is formed on the outer side of the third sealing ring 36 for venting, preventing excessive internal pressure. Structurally, the notch 361 can be formed by providing a second protrusion on the outer side of the third sealing ring 36, with the notch 361 set between adjacent protrusions.

Referring to FIGS. 2-15, the extraction assembly includes a water inlet seat 41 and a base 45. Different internal configurations can be used between the water inlet seat 41 and the base 45, such as a powder tank outer bowl 42, a powder bowl 43, a rupturing plate 49, and so on.

Figure 16:
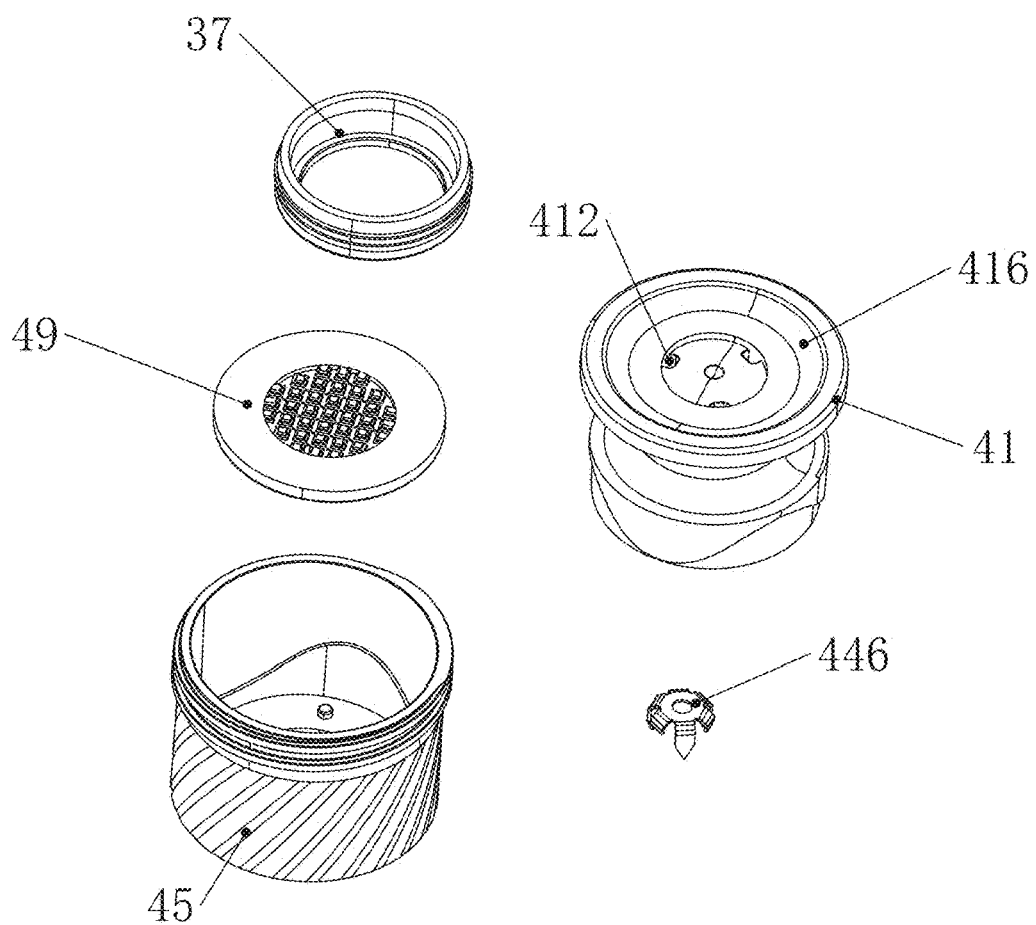
FIG. 16 is an exploded view of a third structure of the extraction assembly.
Figure 17:
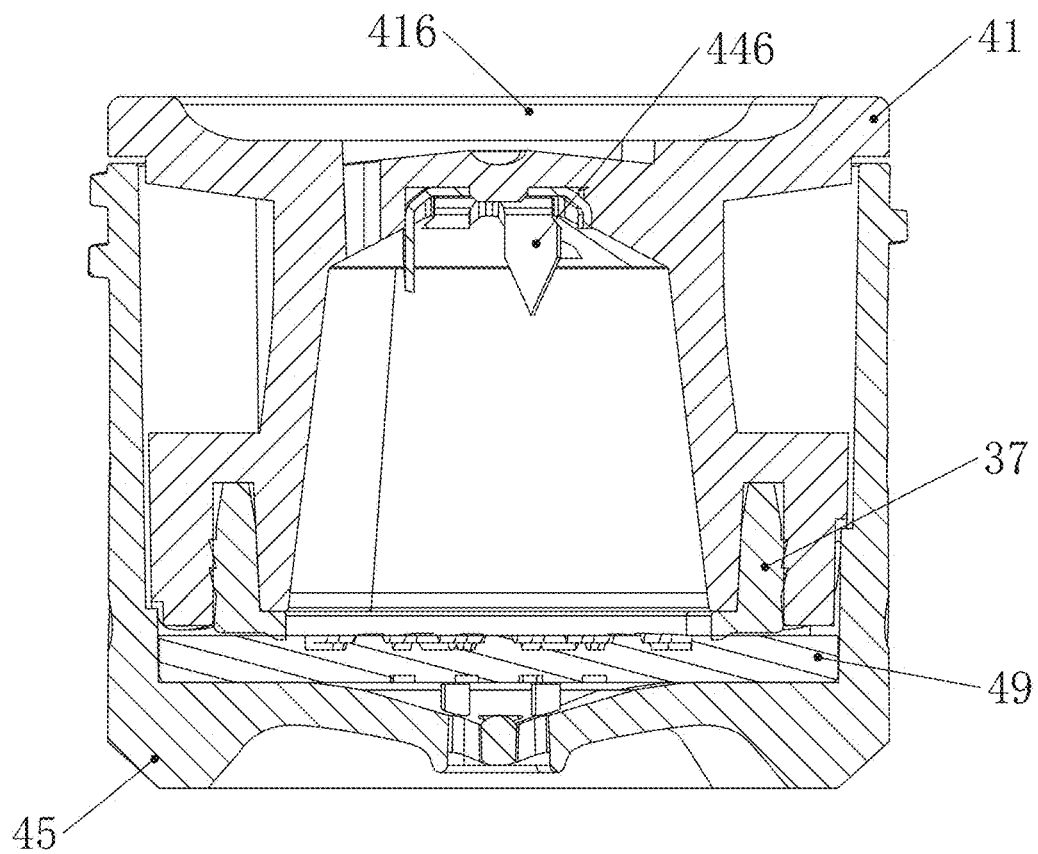
FIG. 17 is a cross-sectional structural schematic diagram of the third structure of the extraction assembly.
Figure 18:
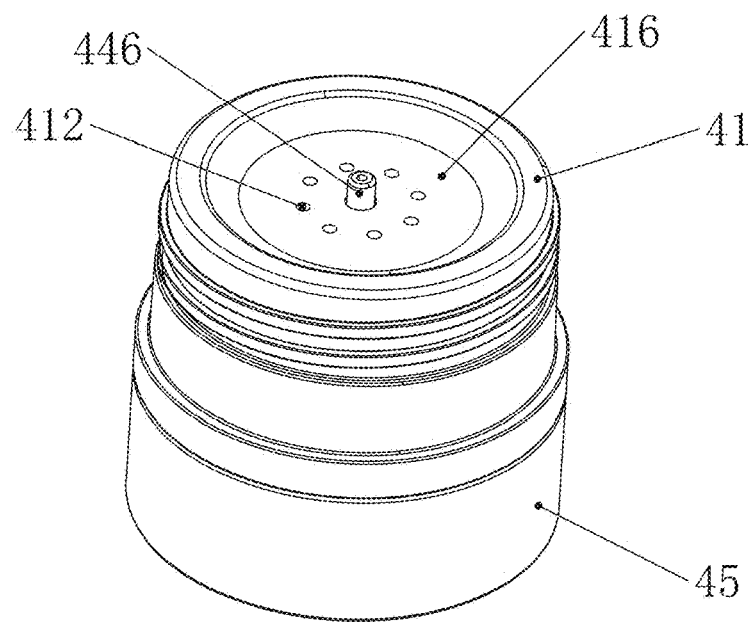
FIG. 18 is a structural schematic diagram of the piercing component.

When the extraction assembly is "Structure Three", it is designed to accommodate Nespresso capsules and other capsules of the same dimensions. The water inlet seat 41 and the base 45 together accommodate both the rupturing plate 49 and the piercing needle 446. The capsule top is pierced first by the piercing needle 446 to allow water to enter; the rupturing plate 49 then pierces the bottom of the capsule to allow water to exit. As shown in FIGS. 16 and 17, the water inlet seat 41 is a capsule tank water inlet seat, forming an extraction capsule tank between it and the base 45. The rupturing plate 49 is arranged inside the extraction capsule tank and mounted on the base 45. The capsule tank water inlet seat forms a cavity for a coffee capsule, and a piercing needle 446 is arranged on the upper side of the capsule tank water inlet seat. The seat and the base 45 cooperate to clamp the capsule edge. A fifth sealing member 37 is arranged between the water inlet seat 41 and the rupturing plate 49 to prevent liquid from flowing elsewhere.

Inside the base 45, the inner wall is provided with a third stopper (not labeled in the figures), whose upper surface is wavelike. A first stopper groove is provided on the external bottom side of the water inlet seat 41, aligning with the third stopper. This alignment restricts rotation between the water inlet seat 41 and the base 45.

Referring to FIGS. 18-22, when the extraction assembly is "Structure Four", it includes a piercing component consisting of the water inlet seat 41, a second mounting plate 44, and a piercing needle 446 located between them. The water inlet seat 41 is formed with multiple water inlet openings 412 for water flow.

Below these water inlets 412, the second mounting plate 44 is formed with a second cavity, which is connected to a second channel 441. The bottom of the piercing needle 446 is movably installed within the second channel 441, while the top of the piercing needle 446 passes through and protrudes above the water inlet seat 41. A third channel 4461 for water flow is formed in the middle portion of the piercing needle 446, and a side opening 4462 is formed on its side wall to connect the second cavity and the third channel 4461.

Thus, when water flows to the second mounting plate 44, it enters the third channel 4461 through the side opening 4462 and then flows into the capsule 70. This greatly reduces the amount of water retained on the second mounting plate 44.

The number of side openings 4462 can be chosen as needed. For example, side openings 4462 may be provided on both sides of the piercing needle 446, with each side opening 4462 in communication with the third channel 4461. Furthermore, the two side openings 4462 are symmetrically arranged.

To avoid a large rush of water, the second channel 441 is formed by at least two third protruding plates 442 arranged in an enclosure, with gaps between adjacent plates 442. In practical use, by configuring the third protruding plates 442 and the gaps, flow diversion is achieved. Additionally, the number of third protruding plates 442 can be selected based on actual requirements. For example, the second mounting plate 44 is provided with four third protruding plates 442 on the outer side of the second channel 441.

In use, the second mounting plate 44 is positioned within the water inlet seat 41 and secured by screws. Because the water inlet seat 41 must be removed from the base 45 in order to place the capsule in the base 45, it is important that the piercing needle 446 reliably retract so that it does not protrude and risk injuring the user.

Hence, a boss 443 is formed below the second channel 441 on the second mounting plate 44, and the boss 443 is formed with a second through hole 444 that communicates with the second channel 441. A spring 447 is placed between the boss 443 and the piercing needle 446 so that, under spring force, the bottom of the piercing needle 446 is positioned within the second through hole 444.

Thus, in practical use, the boss 443 extends the length of the second channel 441. This prevents the piercing needle 446 from protruding through the second mounting plate 44 after reacting, thereby avoiding potential scratching injuries to the user caused by the piercing needle 446. To keep the spring 447 from falling out of the second channel 441, the diameter of the second through hole 444 is made smaller than that of the second channel 441.

Additionally, a stopper plate 4463 is arranged on the outside of the piercing needle 446, and the spring 447 sits between the bottom of the stopper plate 4463 and the boss 443. The top of the stopper plate 4463 can contact the water inlet seat 41 to limit the piercing needle's range of motion. Thus, the stopper plate 4463 both stabilizes the spring 447 and prevents excessive movement of the piercing needle 446.

Figure 4:
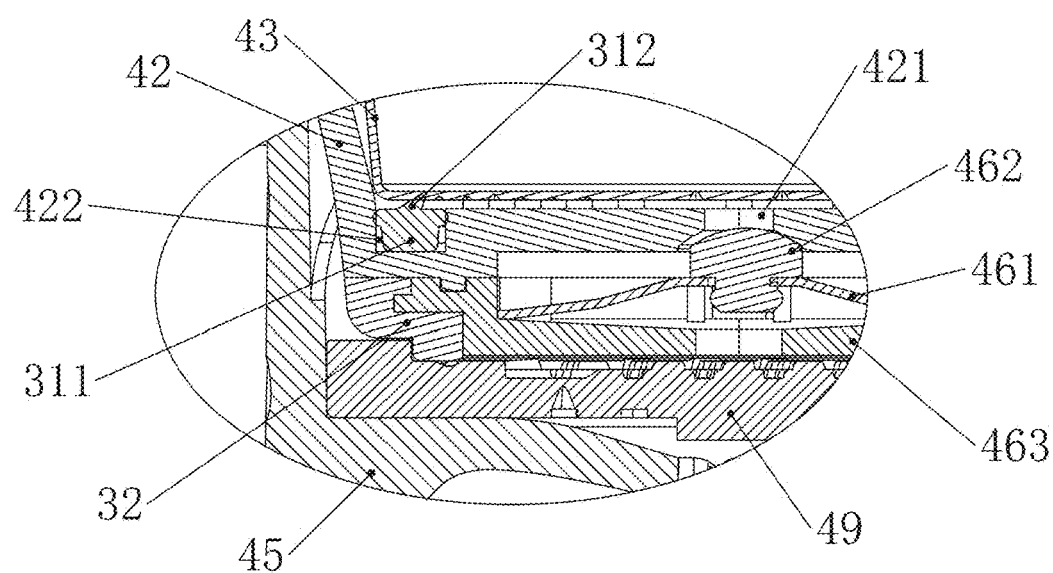
FIG. 4 is an enlarged view of portion A in FIG. 2.

As shown in FIGS. 4, further features of the water inlet seat 41 are as follows: A first recess 416 is formed on the top of the water inlet seat 41, with a third through hole in the bottom of the recess 416 for the piercing needle 446. A water inlet 412 is formed on the outer side of the third through hole in recess 416. Thus, in practical use, by configuring the first recess 416, interference with other components is avoided. Compared to a flat surface, the first recess 416 also provides the function of water-restricting, preventing water from flowing to other areas.

Figure 19:
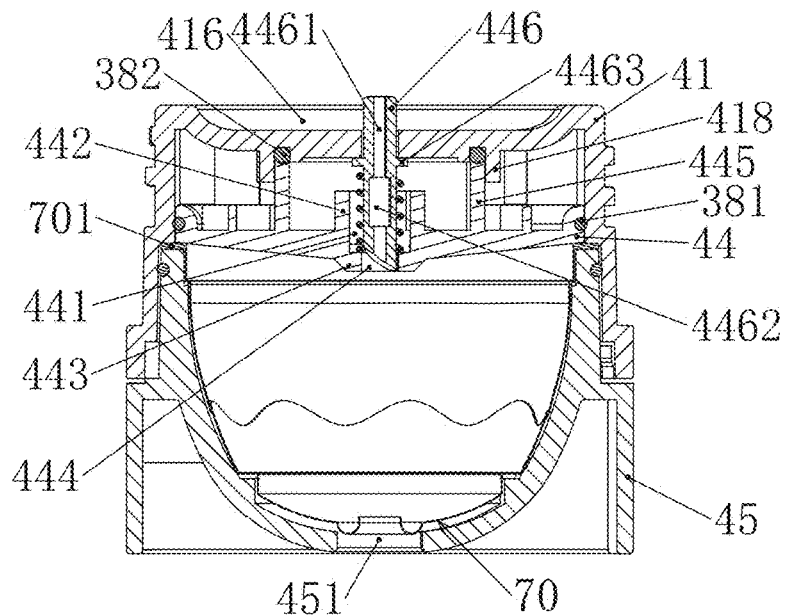
FIG. 19 is a cross-sectional structural schematic diagram of the piercing component.
Figure 20:
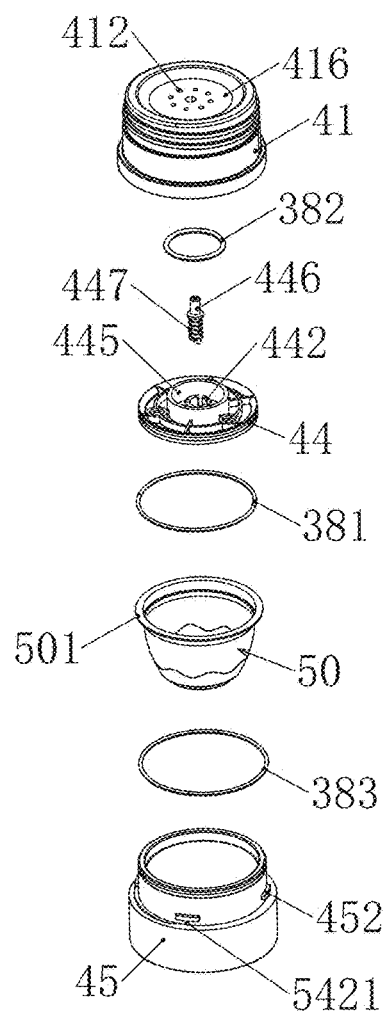
FIG. 20 is an exploded structural schematic diagram of the piercing component.
Figure 21:
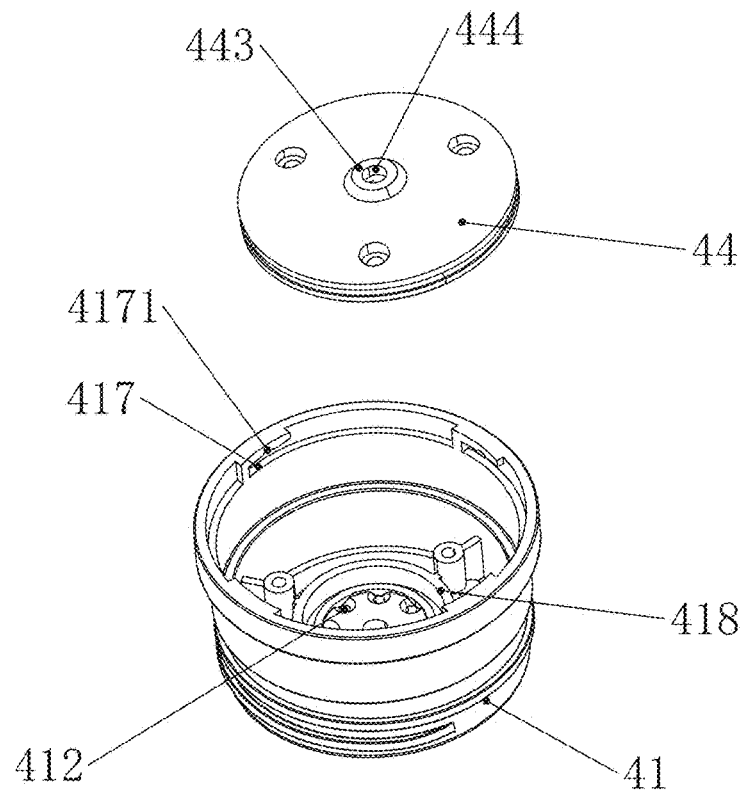
FIG. 21 is a structural schematic diagram of the water inlet seat and the second mounting plate.

As shown in FIGS. 19 and 20, the sealing structure is as follows: a fourth sealing ring 381 is provided between the inner sidewall of the water inlet seat 41 and the outer sidewall of the second mounting plate 44. Additionally, the water inlet seat 41 and the second mounting plate 44 are connected using screws.

A first baffle 418 is arranged inside the water inlet seat 41, and a support plate 445 is arranged on the second mounting plate 44. The inner wall of the support plate 445 encloses a cavity; the support plate 445 is located inside the first baffle 418, and a fifth sealing ring 382 is arranged between the support plate 445 and the water inlet seat 41.

When the extraction assembly is "Structure Four", it also includes a base 45, and any of the aforementioned piercing components. The base 45 is formed with a bearing cavity for accommodating the capsule 70, and a liquid outlet is provided at the bottom of the base 45. The top of the base 45 is positioned inside the water inlet seat 41, with the second mounting plate 44 located between the base 45 and the water inlet seat 41. The inner side wall of the water inlet seat 41 and the outer side wall of the base 45 are detachably connected.

This detachable connection may use a threaded engagement or a rotating latch.

Specifically: The inner side wall of the water inlet seat 41 and the outer side wall of the base 45 may be threaded; or a sliding slot 417 with an open side is formed on the inner side wall of the water inlet seat 41, and a sixth engaging slot 4171 is formed within the sliding slot 417. A second slider 452 is arranged on the outer wall of the base 45.

In practice, the second slider 452 enters the sliding slot 417 through the open side and can move along the slot. A fifth protrusion 4521 is formed on the second slider 452, corresponding to the sixth engaging slot 4171. By matching the fifth protrusion 4521 and the sixth engaging slot 4171, rotation is restricted. To detach, a sufficiently large force can be applied to overcome the stopper and separate the upper cover 113 from the base 45.

The base 45 can support various commercially available aluminum capsules, such as DG capsules, Nespresso capsules, or Starbucks capsules, each having its own internal structure. For example, Nespresso capsules are sealed with coffee grounds inside, while DG capsules include an additional internal filter structure. Depending on the capsule type, different base 45 configurations can be selected.

In the accompanying drawings, a DG capsule is illustrated. After the DG capsule is placed in base 45 and the top of the capsule 70 is punctured by the piercing needle 446, coffee liquid flows out through the bottom filter holes of the capsule and exits through the second liquid outlet 451 on the base 45.

Additionally, a sixth sealing ring 383 is arranged between the outer side wall of the base 45 and the inner side wall of the water inlet seat 41. The top edge of the capsule 70 is provided with a second connecting plate 701, and a step is formed on the inner side wall of the water inlet seat 41. The second connecting plate 701 is positioned between the step and the base 45, and the bottom of the second mounting plate 44 abuts the second connecting plate 701.

When "Structure Four" of the extraction assembly is used, an optimal configuration for the coffee cup mounting bracket is such, preferably, that the mounting bracket 1 has a first channel 11 for water flow and at least one overflow slot that communicates with the first channel 11. This overflow slot increases outflow diameter, allowing faster water outflow and matching well with multiple water inlets 412.

Notably, the diameter of the first channel 11 is smaller than that of the piercing needle 446, and the first channel 11 plus the overflow slot together form a "plus-shaped" outflow structure different from the shape of the piercing needle 446. Thus, once the extraction structure is assembled and mounted onto the mounting bracket 1, the piercing needle 446 aligns with this outflow structure and is pressed downward, causing the capsule 70 to be initially pierced. After extraction is completed and the extraction structure is removed from the mounting bracket 118, the piercing needle 446 automatically retracts under spring force and is hidden in the boss 443.

Therefore, when using capsule extraction with a DG capsule as an example, the capsule 70 is placed in the base 45. When the piercing component is mounted on the coffee machine, the piercing needle 446 is pushed downward by the mounting bracket 1 and further driven by water pressure to puncture the capsule 70 for pressurized extraction. Because DG capsules come with built-in pressure mechanisms, coffee can be extracted even without the base 45 in some cases. One can also select an alternative base 45 structure for different capsule types. Another possibility is using the cup body described in the earlier utility model with application No. 2021221884101.

Referring to FIGS. 2-9, "Structure One" is suitable for extracting coffee powder. Specifically, the water inlet seat 41 and the base 45 accommodate a powder tank outer bowl 42 and a powder bowl 43. Coffee powder is placed in the powder bowl 43; the filter holes in the powder bowl 43 prevent coffee powder from passing through, and the powder bowl 43 can hold at least 10 g of coffee powder. More specifically, the water inlet seat 41 in this structure is a powder tank water inlet seat, forming an extraction powder tank with the base 45. A powder tank outer bowl 42 is arranged inside the extraction powder tank, and a powder bowl 43 is placed inside the powder tank outer bowl 42. The water inlet seat 41 covers the powder bowl 43 and cooperates with the powder tank outer bowl 42 to clamp the powder bowl 43 in place.

For the detailed structure of Powder Bowl 43, a pressing portion 411 is provided on the outer side of the water inlet seat 41. A plurality of filter holes are formed in the bottom of the powder bowl 43, which fits into the powder tank outer bowl 42. A first sealing ring 31 is arranged between them, located outside the filter holes. Thus, in practical use, by configuring the first sealing ring 31 and its cooperation with the filter holes, water is prevented from flowing to other areas.

For the relevant structure of the top of the Powder Bowl 43, a first connecting portion 431 is arranged on the outer side of the top of the powder bowl 43. The first connecting portion 431 is located between the pressing portion 411 and the top of the powder tank outer bowl 42. A connecting slot 4311 is formed at the bottom of the first connecting portion 431, aligning with the top of the powder tank outer bowl 42. By clamping the pressing portion 411 together with the top of the powder tank outer bowl 42, the powder bowl 43 is secured. To ensure a more stable connection, a connecting slot 4311 is provided at the bottom of the first connecting portion 431, which is adapted to the top of the powder tank outer bowl 42.

Compared with a conventional plate filter, the powder bowl 43 is more convenient to install, requiring only one correct orientation with no tilting and further adjustment. Moreover, once placed, the bowl 43 rarely shifts within the powder tank outer bowl 42. The powder bowl 43 is generally made of metal, significantly reducing contact between the liquid and plastic components compared to plate-shaped filter screen.

Figure 3:
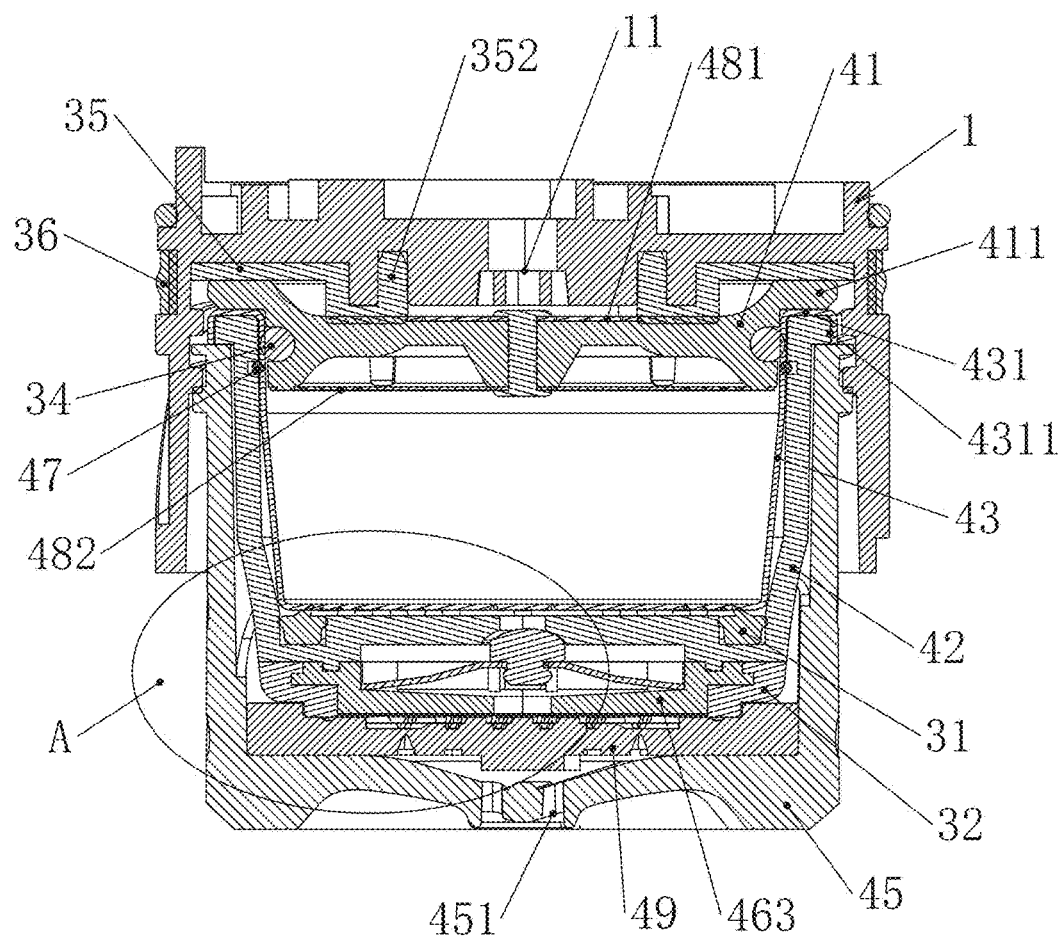
FIG. 3 is a cross-sectional structural schematic diagram of FIG. 2.
Figure 5:
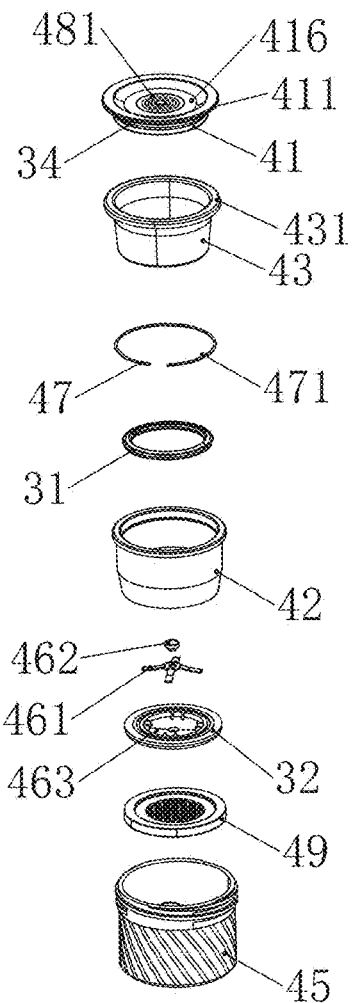
FIG. 5 is a split schematic diagram of the first structure of the extraction assembly.
Figure 6:
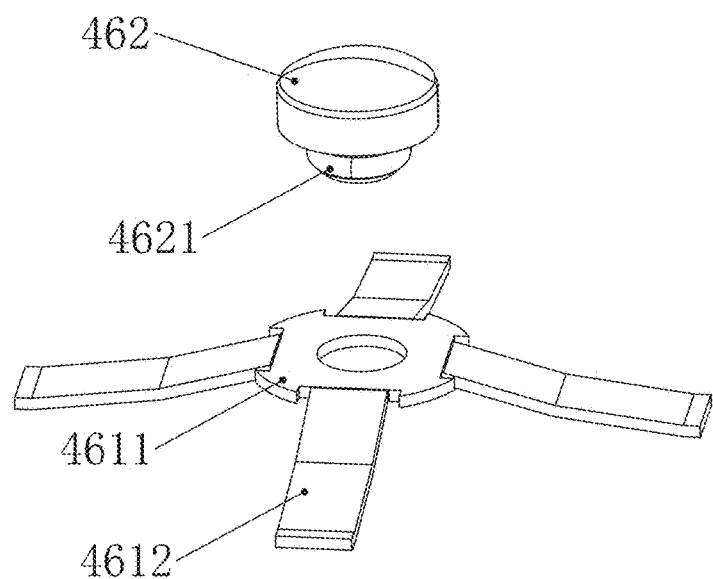
FIG. 6 is a structural schematic diagram of the first elastic member and the first plug.
Figure 7:
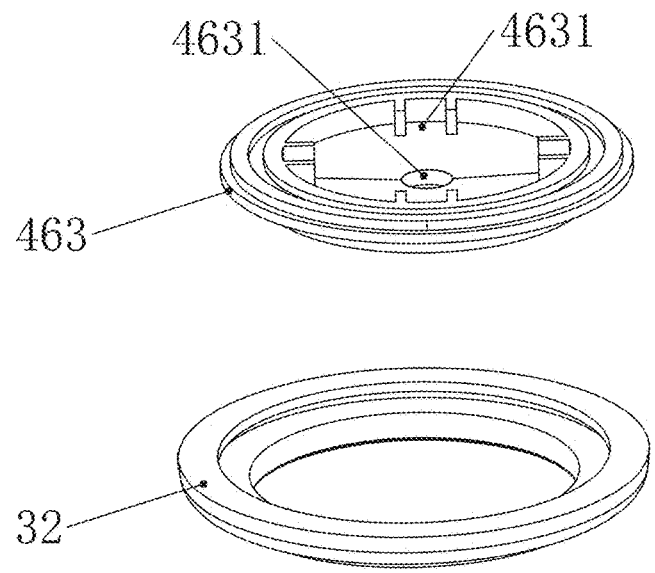
FIG. 7 is a structural schematic diagram of the bottom cover and the second sealing member.

As shown in FIGS. 3-5, an elastic member 47 (called "second elastic member" in the figures) can be installed to make the installation of the powder bowl 43 more stable. The water inlet seat 41 has a second main body, and a pressing portion 411 is arranged on the top outer side of this second main body. An elastic member 47 is arranged on the inner wall of the powder tank outer bowl 42. At least one protruding portion 471 is arranged on the inner wall of the elastic member 47, cooperating with the outer side of the second main body to clamp and stabilize the powder bowl 43. In practice, the protruding portion 471 cooperates with the outer side of the second main body to abut against the powder bowl 43, ensuring a more stable installation of the powder bowl 43.

The installation of the second elastic member 47 is as follows: a groove is provided on the inner wall of the powder tank outer bowl 42 for accommodating the second elastic member 47. Additionally, a second sealing ring 34 is arranged on the outer side of the second main body. The protruding portion 471 and the second sealing ring 34 are positioned on opposite sides of the side wall of the powder bowl 43. Furthermore, the protruding portion 471 is adapted to the second sealing ring 34 to abut against the powder bowl 43, thereby ensuring a more stable installation of the powder bowl 43.

It should be noted that the aforementioned method of stably installing the powder bowl 43 within the powder tank outer bowl 42 using the second elastic member 47 is a detachable assembly method. In addition to this method, the powder bowl 43 can also be fixed within the powder tank outer bowl 42 through other methods such as welding or interference fitting.

As shown in FIGS. 3-5, the installation structure of the first sealing ring 31 is as follows: a first liquid outlet 421 is formed at the bottom of the powder tank outer bowl 42, and a first mounting slot 422 is formed on the inner bottom surface of the powder tank outer bowl 42 on the outside of the first liquid outlet 421. The first sealing ring 31 is arranged within the first mounting slot 422.

Structurally, the first sealing ring 31 comprises a first main body 311 and a first protrusion 312 on top of the first main body 311. The first protrusion 312 is located outside the multiple filter holes and touches the bottom of the powder bowl 43. Both the inner and outer sides of the protrusion 312 are inclined surfaces sloping toward the first liquid outlet 421. Thus, in practical use, since the bottom of the powder bowl 43 generally does not make complete contact with the inner bottom surface of the powder tank outer bowl 42, the first protrusion 312 is designed to fill this gap. Additionally, the first protrusion 312 is inclined and oriented toward the first liquid outlet 421, thereby increasing the contact area between the liquid and the first sealing ring 31, which in turn provides a cushioning effect.

For cost considerations, the dimensions of the upper and lower parts of the first main body 311 can be different. Therefore, the outer side of the upper part of the first main body 311 is in contact with the inner sidewall of the installation groove 422, while the size of the lower part is smaller than that of the upper part.

As shown in FIGS. 3-9, hot water flows from the mounting bracket 1 through the water inlet seat 41, the powder bowl 43, the powder tank outer bowl 42, and out via the base 45. A mechanism is provided between the powder tank outer bowl 42 and the base 45 to control whether fluid passes through, preventing leftover coffee in the bowl from leaking and thus reducing mess.

A typical configuration is: The bottom of the powder tank outer bowl 42 has a first liquid outlet 421. The base 45 is formed with a second liquid outlet 451, corresponding to the first liquid outlet 421. A first elastic member 461 is arranged between the powder tank outer bowl 42 and the base 45. A first plug 462 is arranged on the first elastic member 461, corresponding to the first liquid outlet 421.

Under spring force of the first elastic member 461, the top of the first plug 462 seals the first liquid outlet 421, preventing communication with the second liquid outlet 451. When water pressure is exerted on the first plug 462, it moves downward, opening the path between the first liquid outlet 421 and the second liquid outlet 451.

The structure of the first elastic member 461 is as follows: A bottom cover 463 may be placed between the powder tank outer bowl 42 and the base 45, having an outlet 4632 corresponding to the first liquid outlet 421. The first elastic member 461 is located between the bottom cover 463 and the powder tank outer bowl 42, and the movement of the first plug 462 decides whether the first liquid outlet 421 communicates with the outlet 4632. Because the base 45 is equipped with a rupturing plate 49. When the powder tank outer bowl 42 and the powder bowl 43 are removed and the capsule is placed, the rupturing plate 49 serves to pierce the capsule. Therefore, to prevent the first elastic member 461 from being affected by the rupturing plate 49, a bottom cover 463 is provided to separate the first elastic member 461 from the rupturing plate 49.

The bottom cover 463 has at least two placement slots 4631, and the first elastic member 461 comprises a second connecting portion 4611 and elastic pieces 4612 located on its outer side. The first plug 462 is arranged on the second connecting portion 4611, and the elastic pieces 4612 are angled, with the ends farthest from the second connecting portion 4611 positioned within the placement slots 4631.

Thus, in practical use, by positioning one end of the elastic piece 4612, which is far from the second connecting portion 4611, within the placement slot 4631, relative rotation is restricted. Furthermore, to ensure more stable installation, four elastic pieces 4612 can be set.

The structure between the first plug 462 and the second connecting portion 4611 is as follows: a latch block 4621 is formed on the bottom of the first plug 462, corresponding to a hole in the second connecting portion 4611. A second sealing member 32 is arranged on the outside of the bottom cover 463, with a stepped bottom surface to increase the contact area with the rupturing plate 49 and prevent water from flowing elsewhere.

Figure 8:
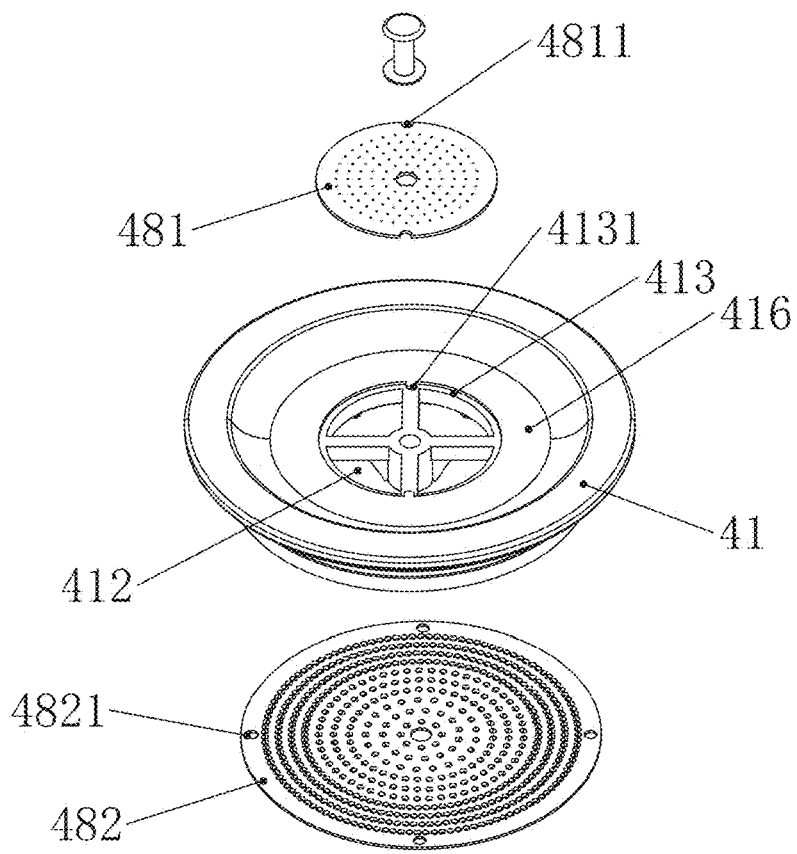
FIG. 8 is a split structural schematic diagram of the water inlet seat.
Figure 9:
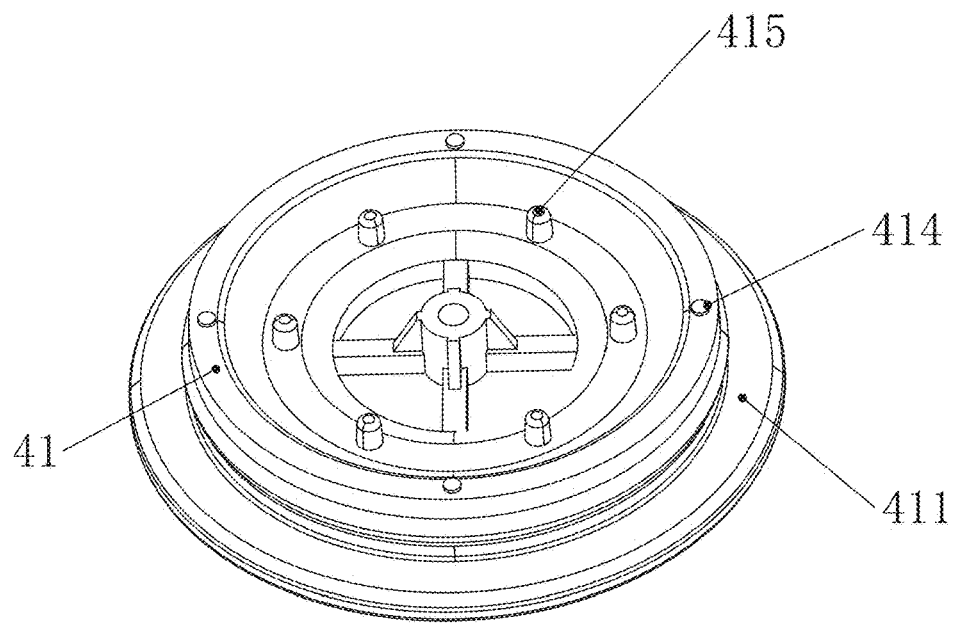
FIG. 9 is a structural schematic diagram of the bottom of the water inlet seat.

Referring to FIGS. 8 and 9, the water inlet seat 41 is formed with a water inlet 412 for water flow. A water inlet screen 481 and an outlet screen 482 are arranged on the upper and lower sides of the water inlet 412, each with an aperture of about 0.3 mm. In practice, the water inlet screen 481 and the outlet screen 482 split the water into multiple streams and block splattering coffee grounds or liquid during extraction.

For the installation of the water inlet screen 481, a storage slot 413 is formed in the water inlet seat 41, where a first protrusion 4131 is arranged. The water inlet screen 481 is placed into the storage slot 413, and a third engaging slot 4811 is formed in the screen 481, matching the first protrusion 4131. Meanwhile, For the installation of the outlet screen 482, the bottom of the water inlet seat 41 features a second protrusion 414, corresponding to which the outlet screen 482 is formed with a first engaging hole 4821. A supporting post 415 is arranged on the bottom of the water inlet seat 41, providing support for the outlet screen 482. Screws can be used to further secure the screens.

Additionally, to facilitate extraction during the coffee pouring process, additional structures are incorporated. Specifically, the utility model further includes a powder-receiving ring 50, which is secured to the edge of the powder bowl 43 by a snap fit. When ground coffee needs to be added to the powder bowl 43, the powder-receiving ring 50 is mounted onto the powder bowl 43. Since ground coffee is relatively loose, directly pouring over 10 g of coffee powder into the powder bowl 43 would inevitably spill outside. The powder-receiving ring 50 increases the space available for holding the coffee powder, making it easier to fill the powder bowl 43 with a single portion of coffee powder. Afterward, the powder bowl 43 can be gently shaken on a flat surface, and a tamper can be used to compress the coffee powder, ensuring that all the coffee powder enters the powder bowl 43.

The structure between the powder-receiving ring 50 and the powder bowl 43 is as follows: the powder-receiving ring 50 includes an abutting portion 501 and a second mounting portion 502 on its outer side. A third protrusion 503 is formed on the inner side of the second mounting portion 502. The sidewall of the first connecting portion 431, located on the outer side of the connecting slot 4311, is a side edge. During assembly, the bottom of the abutting portion 501 contacts the upper surface of the first connecting portion 431, and the top of the third protrusion 503 mates with the bottom edge of that side wall, securing the powder-receiving ring 50.

This utility model also includes a folding spoon 60, where the first function of the folding spoon 60 is to hold coffee beans or ground coffee, and its second function is to act as a tamper. The specific structure is as follows: the folding spoon 60 comprises a spoon body 601 and a spoon handle 602 pivotably arranged on the spoon body 601. The spoon body 601 can fit inside the powder bowl 43 to compress coffee grounds. After the spoon is unfolded, it can be latched in place: a second protrusion 605 is formed at the pivot end of the handle 602, and the spoon body 601 is formed with a fifth engaging slot 606. In practical use, the interaction between the second protrusion 605 and the fifth engaging slot 606 ensures that after unfolding, the spoon handle 602 is restricted from rotating.

When folded, a third protrusion 603 is formed on the inside end of the spoon handle 602, matching a second engaging slot 604 in the spoon body 601 to keep it stable in its folded position. In practical use, the interaction between the third protrusion 603 and the second engaging slot 604 ensures that after folding, the spoon handle 602 is restricted from rotating. Once folded, the spoon 60 occupies minimal space and can fit completely in the powder bowl 43 (see FIG. 12). The folding spoon 60, powder-receiving ring 50, and powder bowl 43 can be stacked to reduce bulk and facilitate portability. The folding spoon 60 and the powder-receiving ring 50 can also be stored in the main water cup body 82.

Figure 10:
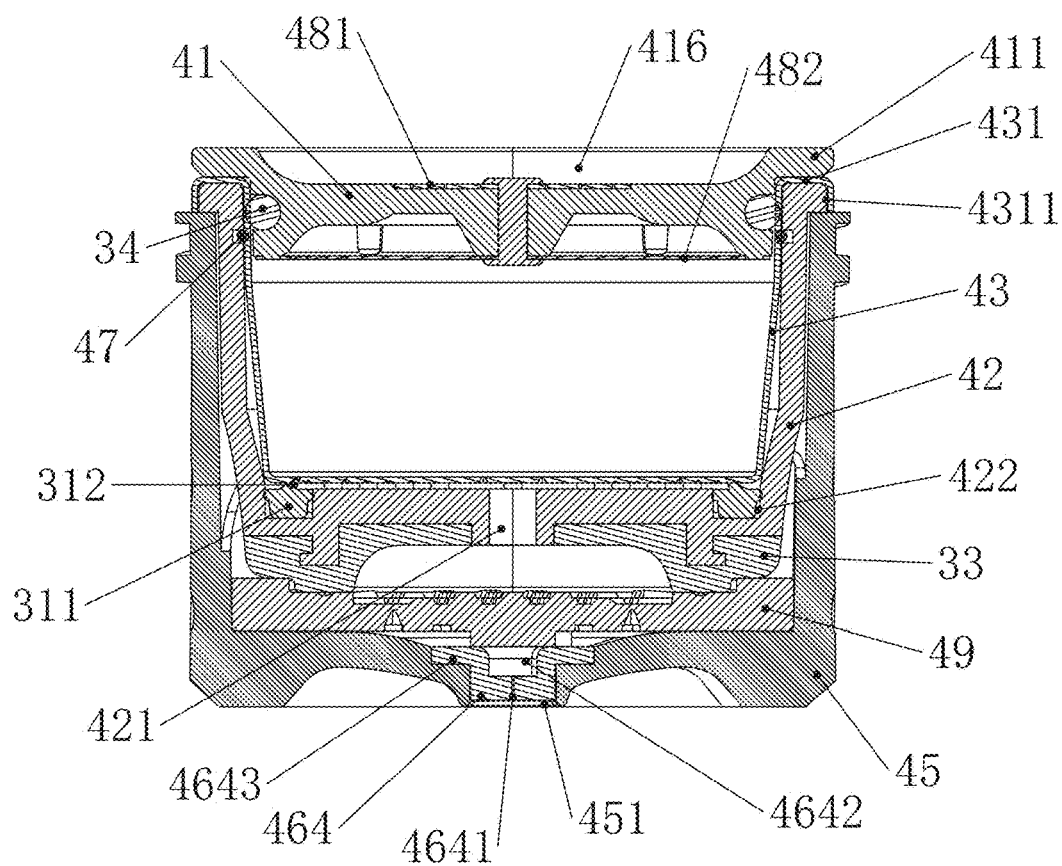
FIG. 10 is a split schematic diagram of a second structure of the extraction assembly.
Figure 11:
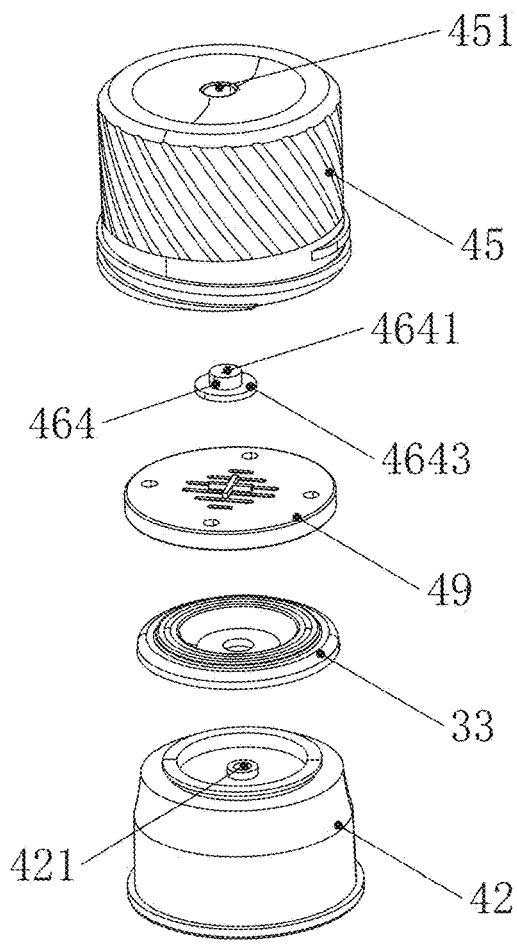
FIG. 11 is a split structural schematic diagram of FIG. 10.
Figure 12:
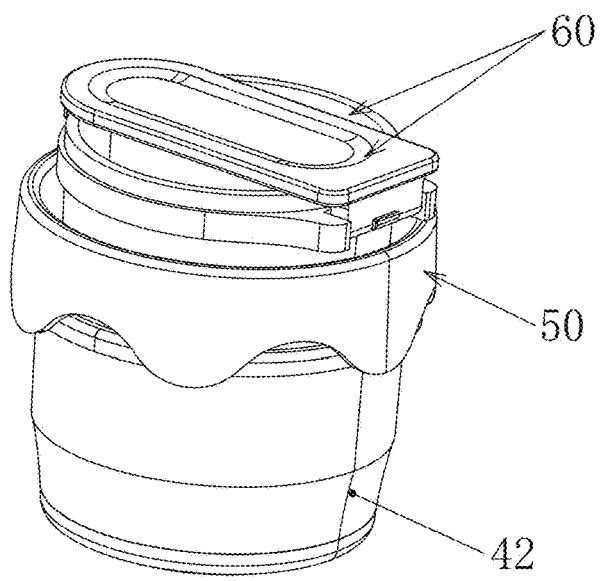
FIG. 12 is a structural schematic diagram of a powder tank outer bowl with a powder-receiving ring, folding spoon, and powder bowl.
Figure 13:
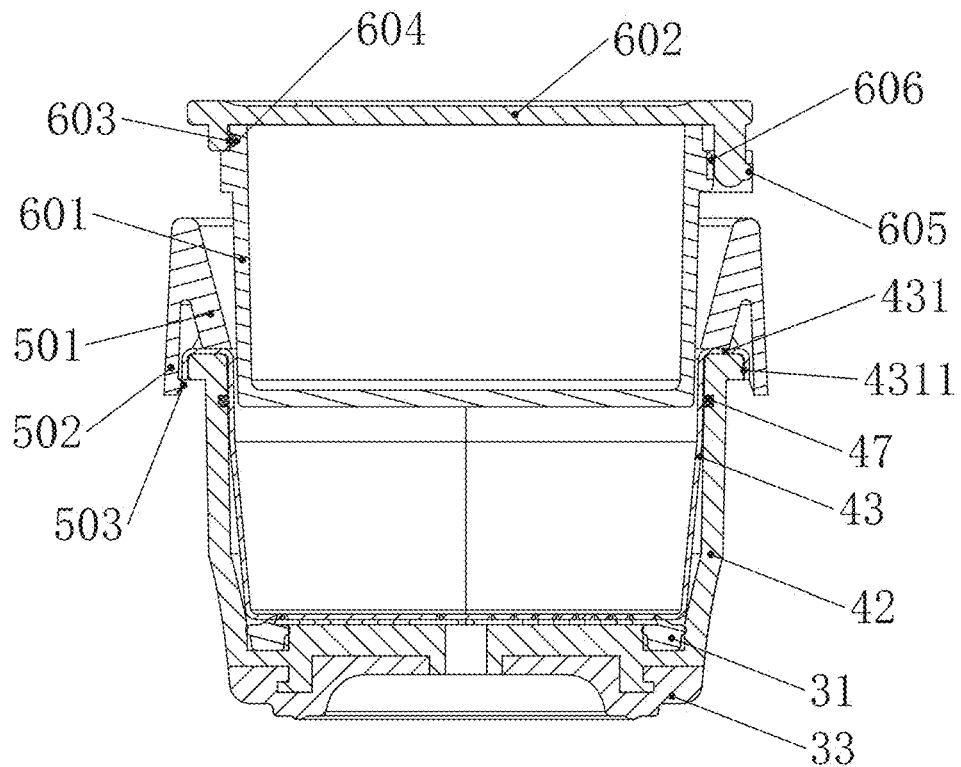
FIG. 13 is a cross-sectional structural schematic diagram of FIG. 12.
Figure 14:
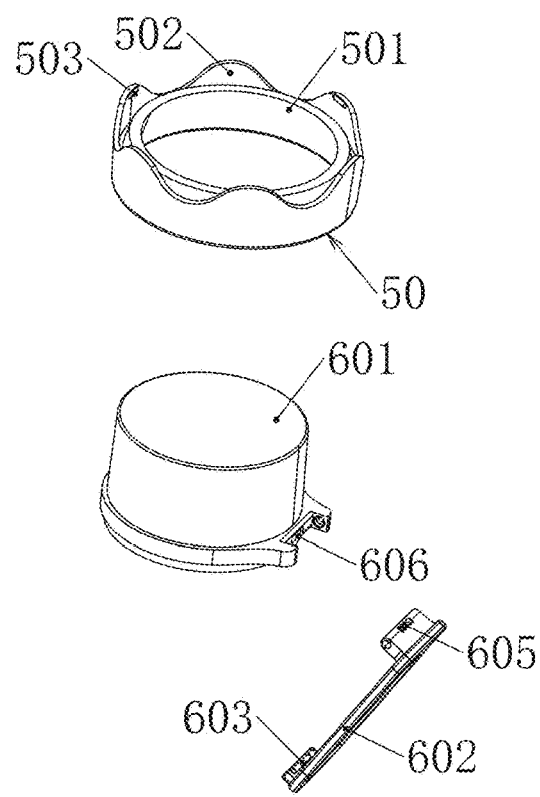
FIG. 14 is an split structural schematic diagram of FIG. 12.
Figure 15:
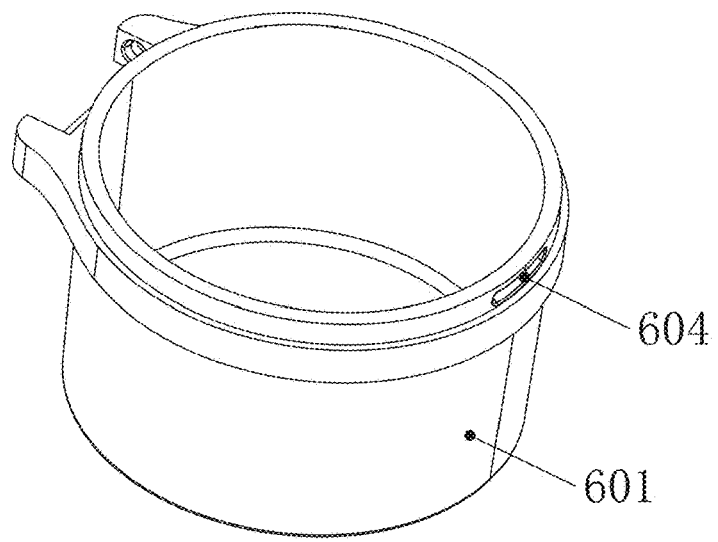
FIG. 15 is a structural schematic diagram of the spoon body.

Referring to FIGS. 10-11, "Structure Two" is also for coffee powder extraction but differs from "Structure One" in the design, position, and assembly of the plug. A second plug 464 is used in "Structure Two", the second plug 464 is used in the base 45. And the first plug 462, first elastic member 461, and bottom cover 463 are not set in the powder tank outer bowl 42.

Specifically, a second plug 464 is arranged within the second liquid outlet 451 in the base 45. The second plug 464 has a first slit 4641 that is closed by default but opens under pressure. For instance, when not in use, the first slit 4641 is in a closed state, and when hot water flows down, the first slit 4641 opens under the applied force.

The structure of the second plug 64 is as follows: a second recess 4642 is formed at the top of the second plug 464, communicating with the slit 4641 to reduce the thickness of the slit 4641 and facilitate opening.

An assembly portion 4643 is formed on the peripheral side of the second plug 464, fitting into a corresponding slot on the base 45. Therefore, the assembly portion 4643 interacts with the assembly slot to achieve installation.

On the bottom of the powder tank outer bowl 42 (on the outside), a third sealing member 33 is arranged with a stepped bottom surface, increasing contact area with the rupturing plate 49, preventing the water from flowing to other areas. The third sealing member 33 can be detachably fixed to the powder tank outer bowl 42. As shown in FIG. 10, the bottom of the powder tank outer bowl 42 is formed with an annular locking hook ring, and the surface of the third sealing member 33 is provided with a second limiting groove that is adapted to the locking hook ring. When assembling, by locking onto a ring-shaped catch on the bottom of the bowl with a second stopper groove in the third sealing member 33, this design simplifies assembly and replacement.

Figure 23:
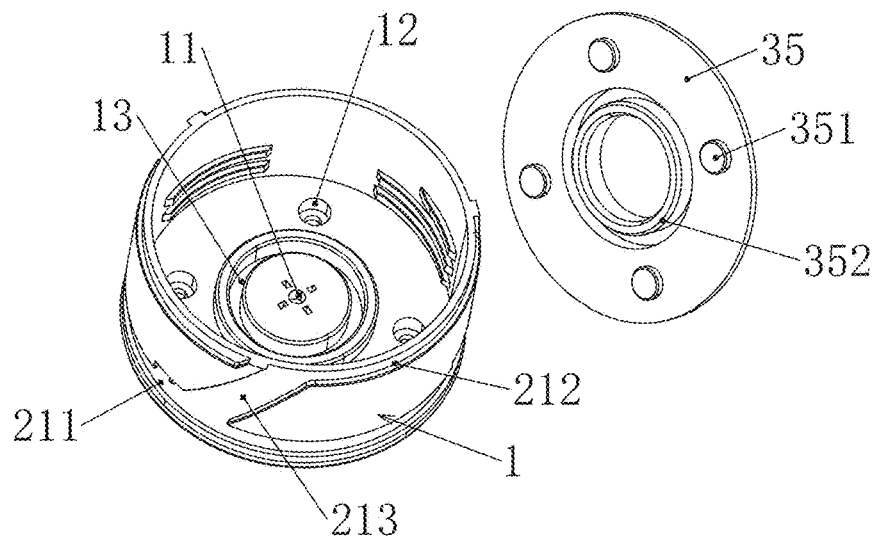
FIG. 23 is a structural schematic diagram of the first sealing member and the mounting bracket.

Referring to FIG. 23, the structure between the mounting bracket 1 and the water inlet seat 41 is as follows: The mounting bracket 1 is formed with a first passage 11 for water flow, and the water inlet seat 41 is formed with a water inlet 412. A first sealing member 35 is arranged on the side of the mounting bracket 1 close to the water inlet seat 41.

The mounting bracket 1 is formed with a first mounting hole 12, and a latch groove 13 is formed on the outside of the first passage 11. The first sealing member 35 is provided with a first latch block 351, matching the first mounting hole 12, and a first latching portion 352, matching the latch groove 13. A first through hole 353 is formed in the first sealing member 35, corresponding to the first passage 11. A sealing surface is formed on the bottom of the first sealing member 35, abutting the water inlet seat 41 outside the water inlet 412 to prevent water leakage.

Therefore, in actual use, compared to having a separate sealing member for each of the first mounting hole 12 and the first passage 11, the present utility model achieves dual sealing at two locations with a single sealing member 35, which simplifies the structure and makes the installation more convenient. To avoid interference with the first sealing member 35, a recess 416 is formed in the water inlet seat 41.

Figure 28:
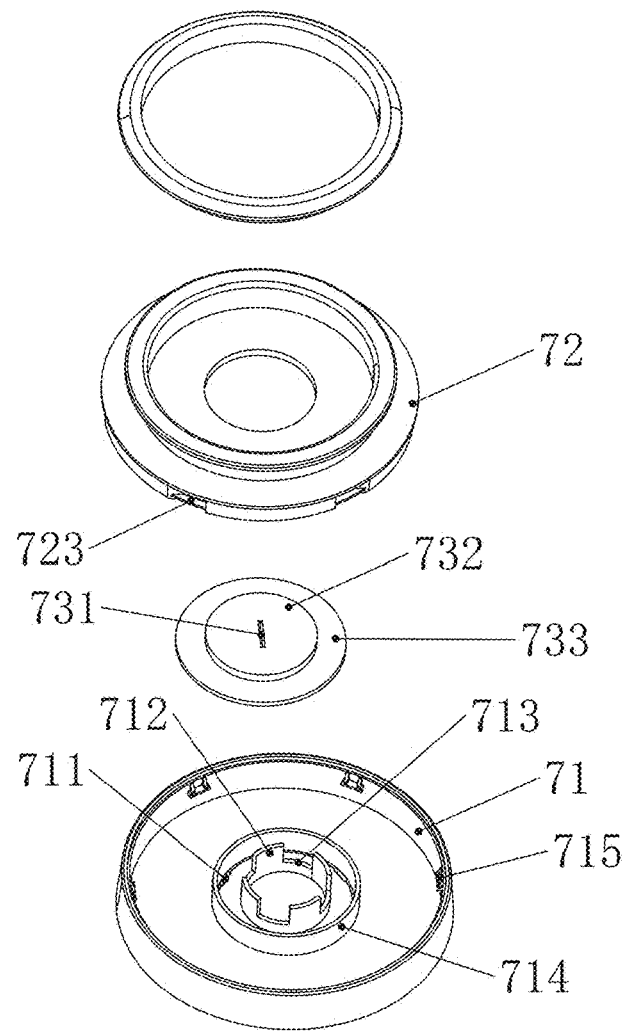
FIG. 28 is an split structural schematic diagram of the lid.

The heating area (FIGS. 24, 28-29) includes the water cup main body 82 and a lid 7. The lid 7 comprises an outer lid 71 and an inner lid 72, arranged within an opening in the bottom of the outer lid 71. A fourth sealing member 73 is arranged between the outer lid 71 and the inner lid 72. An opening in the inner lid 72 exposes the fourth sealing member 73, and the exposed portion of the fourth sealing member 73 is formed with a second slit 731 that opens under force. At least one first vent hole 711 is formed on the top of the outer lid 71, communicating with the inner side of the fourth sealing member 73.

During use, the slit 731 remains closed when not in use, preventing steam from escaping. When ventilation is needed, the slit 731 opens under force, allowing air to pass out through the first vent hole 711 and through the interior of the fourth sealing member 73, providing a airflow channel. Compared to relying solely on gaps, this utility model has better fluidity and enhanced exhaust performance, while also eliminating the need for guide posts, thereby simplifying the structure.

The shape of the second slit 731 is as follows: first, the cross-section of the second slit 731 is V-shaped, with the opening of the V-shape located on the side of the sealing member four 73 that is closer to the water cup body 82, meaning the opening is smaller at the top and larger at the bottom. The larger bottom facilitates the entry of gas, while the smaller top minimizes the discharge of gas when closed.

Figure 24:
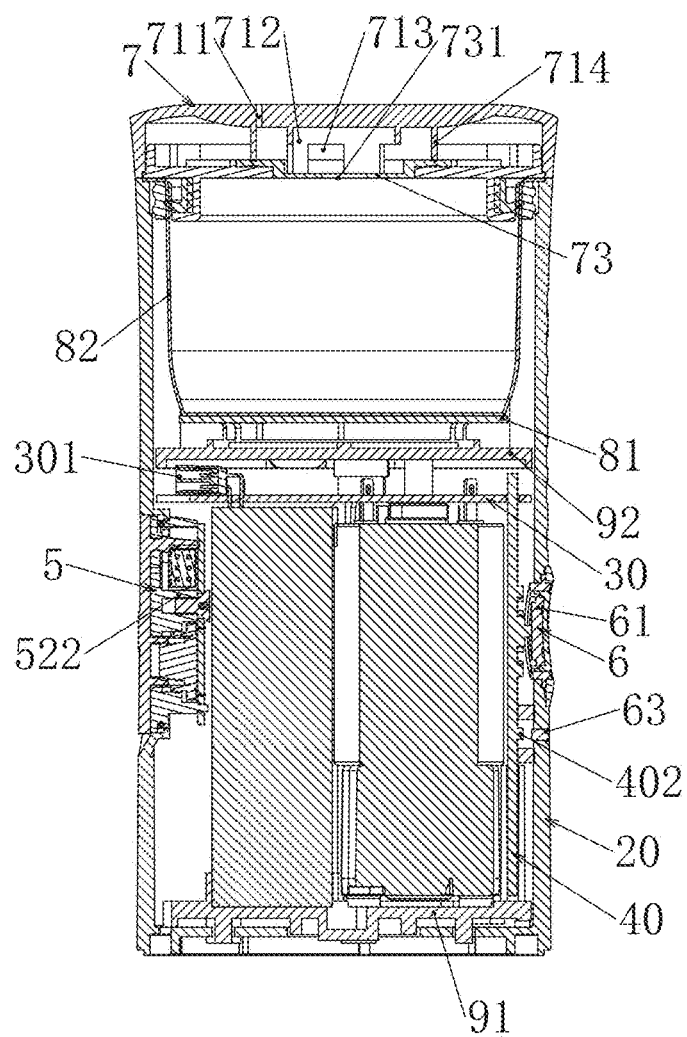
FIG. 24 is a cross-sectional structural schematic diagram of the coffee machine.
Figure 25:
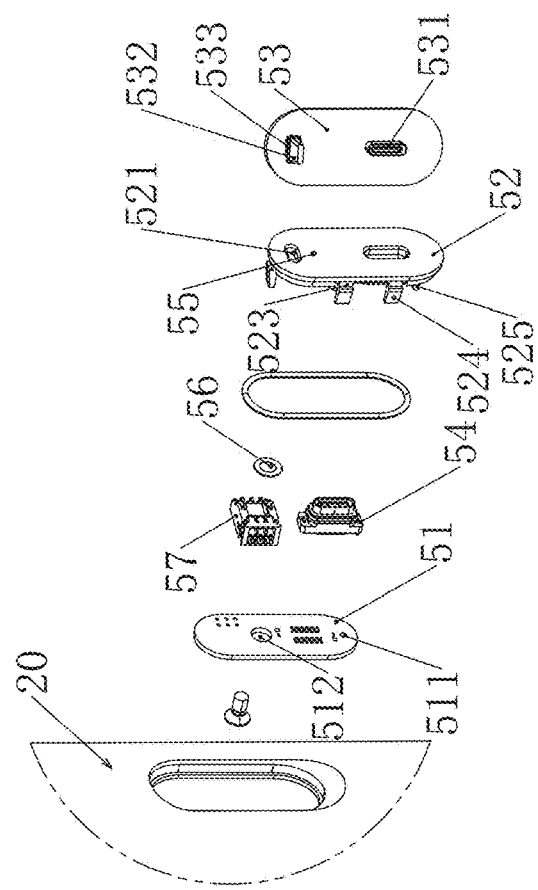
FIG. 25 is a structural schematic diagram of the cup body and the charging assembly.
Figure 29:
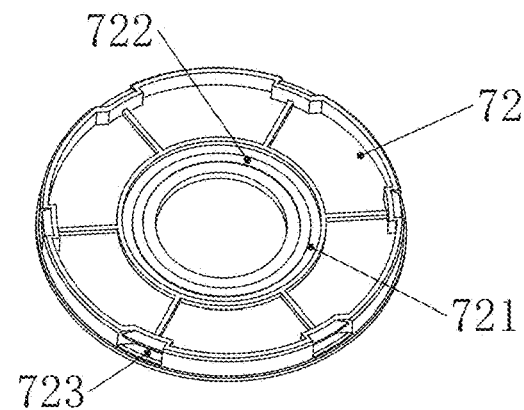
FIG. 29 is a structural schematic diagram of the inner lid.

As shown in FIGS. 24, 25, and 29, additional features ensure controlled airflow and flow division: The inner side of the outer lid 71 is provided with at least two second protruding plates 712. A flow-diverting opening 713 is formed between each pair of adjacent plates 712, guiding airflow toward the first vent hole 711, making it easier to vent the gas.

The flow-limiting structure is as follows: a second baffle 714 is arranged on the inner side of the outer cover 71, with the top of the second baffle 714 located outside the first vent hole 711. The bottom of the second baffle 714 is in contact with the sealing member four 73. In practical use, the second baffle 714 serves multiple purposes. Its top being outside the first vent hole 711 ensures that gas does not flow beyond the first vent hole 711. Additionally, the bottom of the second baffle 714, in contact with the sealing member 73, exerts pressure on the sealing member 73 to ensure the stability of its installation.

As shown in FIG. 24, the installation of the fourth sealing member 73 is as follows: The fourth sealing member 73 comprises an exposed portion 732 and a third connecting portion 733 located on its outer side. The exposed portion 732 is formed with the second slit 731. An opening in the inner lid 72 exposes the exposed portion 732. An inner side of the inner lid 72 is formed with a second mounting slot 721 in which the third connecting portion 733 is placed. In practical use, the sealing member 73 is first placed on the inner side of the inner lid 72. At this point, the third connecting portion 733 is located within the second mounting slot 721, and the exposed portion 32 protrudes through the opening in the inner lid 72.

The bottom of the second baffle 714 is in contact with the third connecting portion 733 and is adapted to the second mounting slot 721, thereby compressing and limiting the third connecting portion 733, ensuring stable installation. In order to further stabilize the installation, the second mounting slot 721 is provided with a first rib 722, and the first rib 722 is in an interference fit with the sealing member 73. Besides this sealing, the water cup main body 82 and the lid 7 are also equipped with a sixth sealing member, thereby preventing gas from flowing in other directions.

The outer lid 71 and the inner lid 72 are connected by a latch, rather than a screw. A latch 715 is arranged on the inner wall of the outer lid 71, and a third engaging slot 723 is arranged on the outer side of the inner lid 72. This design is simpler to install and more convenient than screws.

Figure 22:
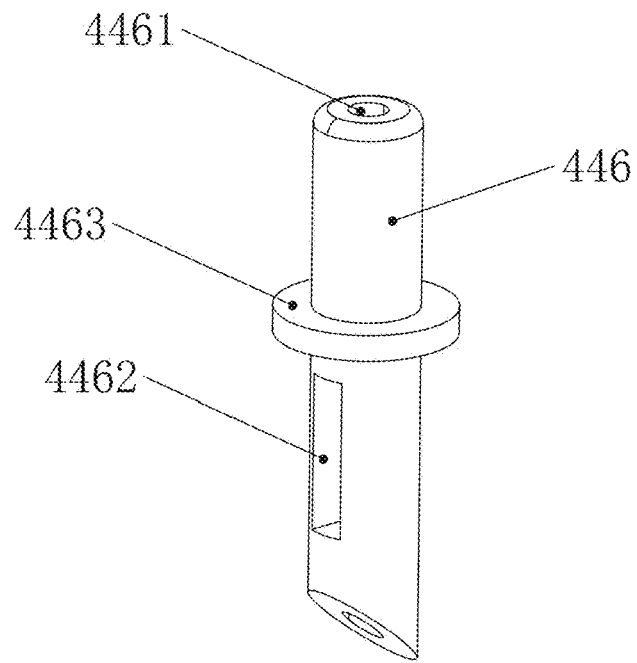
FIG. 22 is a structural schematic diagram of the piercing needle.

As shown in FIG. 22, it can be seen that the bottom or side wall of the water cup main body 82 is provided with a heating plate 81. A conventional design typically uses ceramic heating elements fixed with adhesive, but this heating method has low thermal efficiency, slow heat transfer, and uneven distribution, and the ceramic element is also prone to breakage. Therefore, the heating plate 81 in the present utility model is made of metal and is printed with a heating element, with the heating element consisting of heating wire 811. Both ends of the heating wire 811 are provided with connecting bodies 812. Additionally, the water cup main body 82 and the heating plate 81 are welded together. This is because metal has good thermal conductivity, is durable, and materials like aluminum are sturdy. Moreover, the printed heating wire 811 is not easily damaged by large currents, resulting in a longer lifespan and increased reliability.

The coverage and path of the heating wire 811 are not specifically limited and can be adjusted according to the requirements. The configuration of the connecting body 812 can be in the form of a solder pad connection, a terminal post, or even a spring contact. Additionally, a thermistor 813 is provided on the heating plate 81. In conventional designs, a thermistor 813 is typically attached using aluminum foil, which results in delayed and imprecise temperature control. In contrast, in the present utility model, the thermistor 813 is directly welded onto the heating plate 81, ensuring more real-time and precise temperature control.

Figure 30:
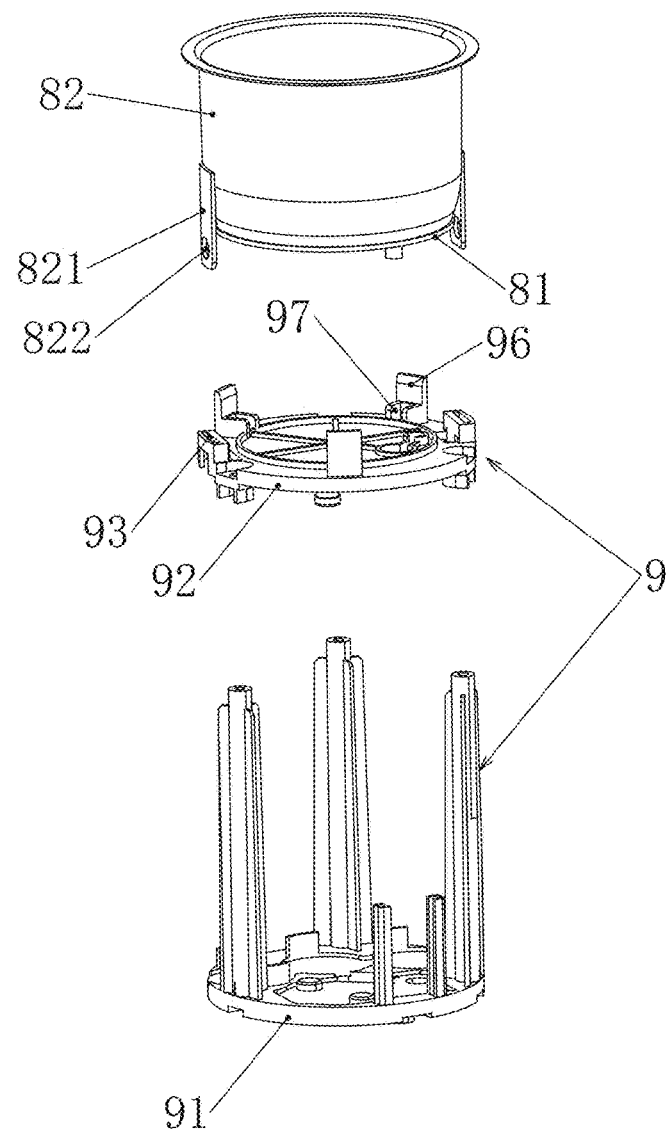
FIG. 30 is a structural schematic diagram of the water cup main body and the assembly bracket.
Figure 31:
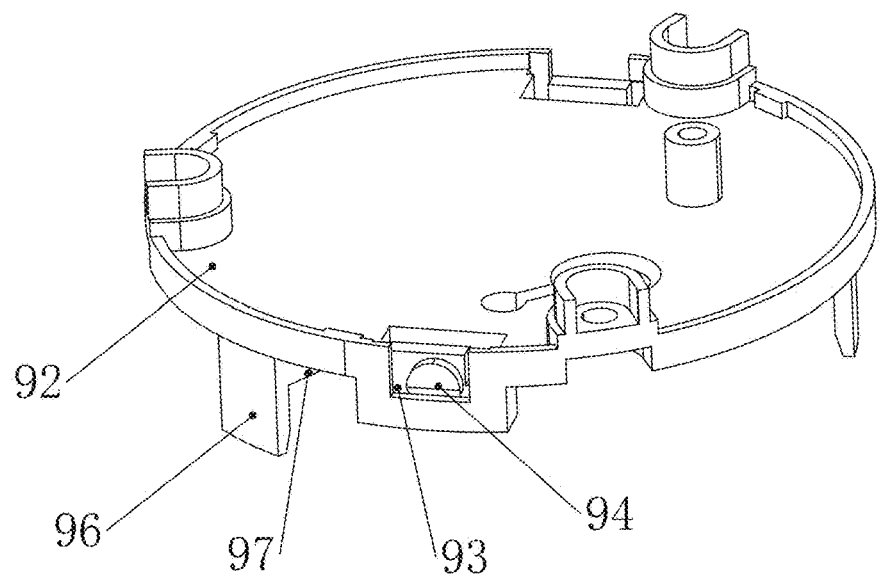
FIG. 31 is a structural schematic diagram of the first mounting plate.
Figure 32:
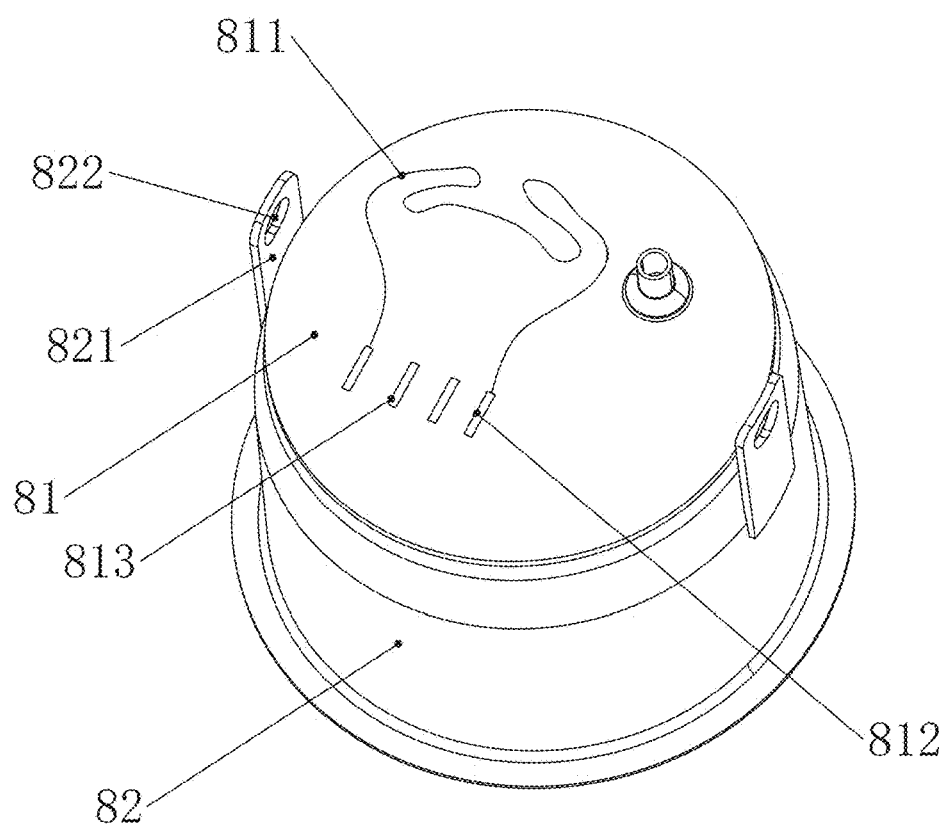
FIG. 32 is a structural schematic diagram of the bottom of the water cup main body.

As shown in FIGS. 30 and 31, the installation structure of the water cup body 82 in the existing design involves an assembly bracket 9 with claws that latch onto the edge of the support ring located beneath the water cup body 82. This results in an additional component, the support ring. Moreover, the third circuit board 30 is directly mounted on the top of the assembly bracket 9 and positioned directly below the water cup body 82. Therefore, the heat generated during the heating process affects the third circuit board 30.

By contrast, this utility model adopts a different structure: An assembly bracket 9 is installed inside the cup body 20, comprising a support 91 and a first mounting plate 92 on the support 91. A third circuit board 30 is arranged between the support 91 and the first mounting plate 92, so the first mounting plate 92 shields the third circuit board 30 from heat.

At the same time, at least two insertion ports 93 are formed on the first mounting plate 92, with a fourth protrusion 94 formed on the inner wall of each insertion port 93. At least two first connecting plates 821 are arranged on the outside of the water cup main body 82, and the bottom of each connecting plate 821 fits into a corresponding insertion port 93. Each connecting plate 821 is provided with a latch hole 822 corresponding to the fourth protrusion 94. Therefore, in practical use, the water cup main body 82 is mounted on the first mounting plate 92 by inserting the bottom of the first connecting plates 821 into the insertion ports 93, where the fourth protrusion 94 engages with the latch holes 822. This design secures the water cup main body 82 in a simpler manner, eliminating the need for additional supporting rings, thus simplifying the structure.

In order to ensure a more stable installation and avoid the heating plate 81 located at the bottom from coming into contact with other components, at least one support block 95 is arranged on the first mounting plate 92. The support block 95 comprises a side plate 96 and a spacer 97 positioned on one side of the side plate 96. In practical use, the spacer 97 is located at the bottom of the water cup main body 82, preventing the heating plate 81 from contacting other components. Meanwhile, the side plate 96 abuts the outer side of the water cup main body 82, preventing any tilting of the water cup main body 82. Furthermore, the heating plate 81, in addition to being arranged at the bottom of the water cup main body 82, may also be arranged on the outer side wall of the water cup main body 82, where it will align with the side plate 96.

Because the motor and heating plate 82 generate heat during operation, and heat is also produced during charging, a venting structure (FIGS. 24-27) is needed. Simultaneously, a waterproof design is essential. The charging assembly 5 and the key assembly 6 are located near the heat sources, making it more appropriate to arrange the vent near them. However, since it is inconvenient to make holes in the key assembly 6, the vent is therefore positioned on the charging assembly 5.

Referring to FIG. 25: A charging assembly 5 is arranged on one side of the cup body 20, adjacent to the heating area. The charging assembly 5 includes a first circuit board 51, a mounting member 52, and a silicone cover 53. The mounting member 52 is installed on the cup body 20, with its inner and outer sides respectively connected to the first circuit board 51 and the silicone cover 53.

A charging connector 54 is arranged on the first circuit board 51, and an opening is formed in the mounting member 52 so that the charging connector 54 is exposed. A second vent hole 55 is formed on the same side of the mounting member 52 as the connector 54. A waterproof breathable membrane 56 is arranged on the inner side of the mounting member 52, corresponding to the second vent hole 55. In practice, by positioning the charging assembly 5 on the heating zone side and providing a waterproof breathable membrane 56, the heat generated by both the heating zone and the charging assembly 5 is vented through the waterproof breathable membrane 56, preventing water from entering the cup body 20 while allowing airflow. Moreover, as the charging assembly 5 is located on the side of the cup body 20, the heat generated within the cup body 20, such as from the motor, can also be vented through the waterproof breathable component.

The charging connector 54 can be a Type-C interface, and the waterproof breathable membrane 56 is a novel polymer waterproof material of an existing structure. The principle behind it is as follows: gas molecules, which have a relatively large distance between them, can pass through the holes in the waterproof breathable membrane 56 during their diffusion process. In contrast, liquid molecules have a smaller distance between them than the hole spacing, and due to surface tension, the liquid molecules cannot pass through the waterproof breathable membrane 56, thus achieving the waterproof effect.

The specific structure of the charging assembly 5 is as follows: The first circuit board 51 is equipped with a first terminal 57, and the third circuit board 30 is equipped with a second terminal 301. The first terminal 57 and the second terminal 301 are connected via wires.

The third circuit board 30 is the main circuit board, responsible for controlling the operation of various components of the coffee machine. It is electrically connected to the first circuit board 51 via the first connector terminal 57 and the second connector terminal 301. This allows for electrical communication between the third circuit board 30 and the first circuit board 51. Compared to conventional coffee machines that have only a single main circuit board, the first circuit board 51 is structured independently of the third circuit board 30. As a result, the first circuit board 51 is positioned closer to the sealing ring and waterproof breathable membrane 56, thereby improving its ability to facilitate ventilation and enhance waterproofing.

The structure of the silicone cover 53 is as follows: An insertion ring 531 is formed on the silicone cover 53, aligning with the charging connector 54 for sealing and waterproofing.

A latching post 532 is formed on the inside of the silicone cover 53, and a connecting hole 521 is formed on the mounting member 52 corresponding to the latching post 532. One end of the latching post 532 passes through the connecting hole 521, and a second stopper 533 is formed on the outer end, with the dimensions of the second stopper 533 being larger than the dimensions of the connecting hole 521. As a result, in practical use, the latching post 532 is inserted through the connecting hole 521 to connect the silicone cover 53 and the mounting member 52. The second stopper 533 then abuts against the inner side of the mounting member 52, preventing the latching post 532 from disengaging from the connecting hole.

The structure of the mounting member 52 is as follows: The cup body 20 has a second mounting hole in which to place the charging assembly 5. A seventh sealing ring (not labeled in the diagram) is arranged between the inner wall of the second mounting hole and the outer side of the mounting member 52 for waterproof sealing. A third protrusion is formed on the inner wall of the second mounting hole. A latching plate 523 is arranged on the inner side of the mounting member 52, and a third latch block 524 is formed on the outer side of the latching plate 523. The third latch block 524, located on the side of the mounting member 52, abuts the third protrusion. As a result, during practical use, the sealing ring serves to provide waterproof sealing, improving the waterproof rating. Furthermore, the third latch block 524 engages with the third protrusion to securely connect the cup body 20 and the mounting member 52.

The connection structure between the mounting member 52 and the first circuit board 51 is as follows: A hollow mounting column 522 is formed on the inner side of the mounting member 52, and a hole 512 is formed on the first circuit board 51 corresponding to the mounting column. A fastener, such as a screw, is inserted through the hole 512 and into the mounting column 522 to connect the mounting member 52 and the first circuit board 51.

Before the fastener is secured, preliminary alignment is required. This structure includes a column 525 on the mounting member 52, with a matching assembly hole 511 formed on the first circuit board 51 corresponding to the column. Thus, in actual use, the connection is achieved through the alignment of the column 525 and the assembly hole 511, ensuring that the mounting column 522 and the hole 512 are preliminarily aligned and positioned before the fastener is tightened.

Figure 26:
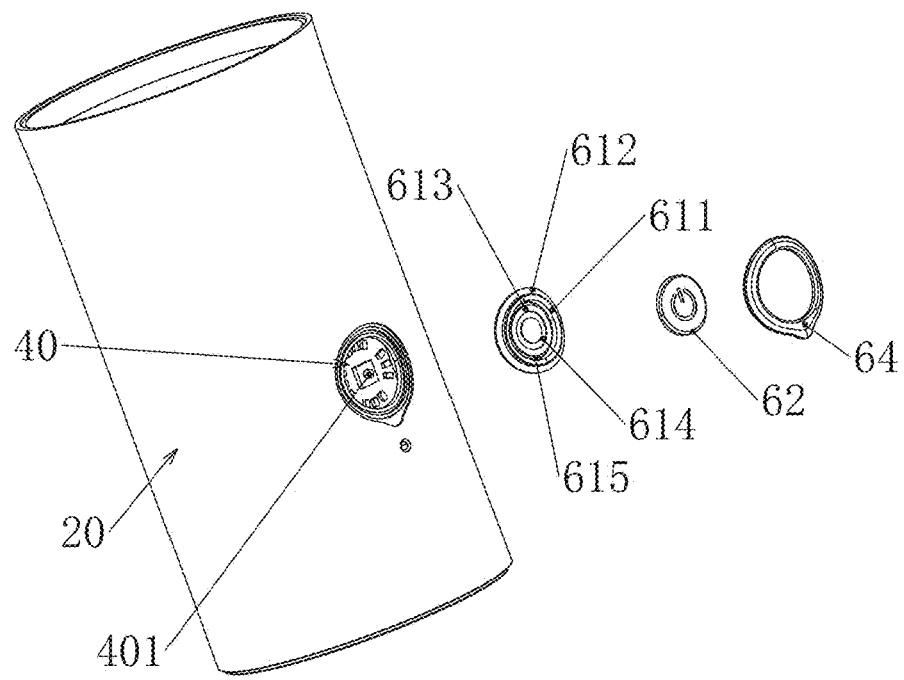
FIG. 26 is a structural schematic diagram of the cup body and the key assembly.

As shown in FIG. 26, to achieve better sealing and waterproofing, the structure of the key assembly 6 has been optimized. The specific structure is as follows: The opposite side of the cup body 20 is provided with the key assembly 6, and a second circuit board 40 is arranged inside the cup body 20 corresponding to the key assembly 6. The key assembly 6 includes a first light-transmitting member 61 and a pressing plate 62 arranged on the first light-transmitting member 61. A button 401 is positioned on the second circuit board 40 corresponding to the pressing plate 62. The first light-transmitting member 61 is elastic and is secondary injection-molded with the cup body 20.

As a result, in actual use, the first light-transmitting member 61 is seamlessly integrated with the cup body 20 due to the secondary injection molding, forming a unified structure without seams or gaps. Compared to the traditional separate structures in existing coffee machines, where buttons and the cup body are assembled using glue or latches, the secondary injection molding provides better waterproofing and a higher level of waterproof performance than current coffee machines.

Secondary injection molding is a process where a plastic part is first formed in a primary molding cavity, then removed and placed in a secondary mold to be injected with the same or a different type of plastic material for further molding.

Additionally, since buttons 401 typically come with indicator lights, a light-emitting element 402 is arranged on the second circuit board 40. For better sealing and waterproofing, a second light-transmitting member 63 is formed on the cup body 20 corresponding to the light-emitting element 402. The second light-transmitting member 63 and the cup body 20 are also secondary injection-molded to ensure a tight seal.

Figure 27:
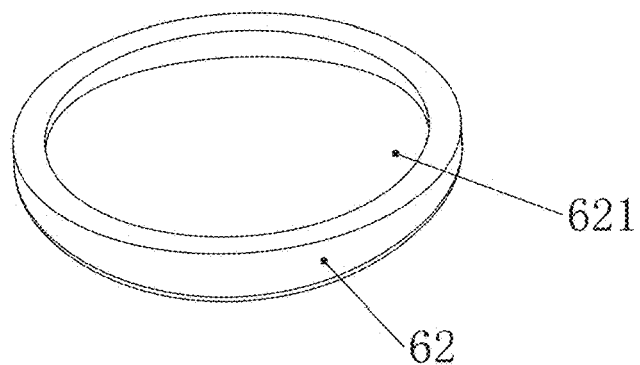
FIG. 27 is a structural schematic diagram of the pressing plate.

Referring to FIGS. 26 and 27, additional details about the key assembly 6 are as follows: A decorative ring 64 is placed around the outer side of the first light-transmitting member 61. A protruding ring 611 is formed on the first light-transmitting member 61, and a first protruding plate 612 is arranged on the outside of the protruding ring 611. The decorative ring 64 is sleeved outside the protruding ring 611, with the protruding plate 612 positioned between the decorative ring 64 and the cup body 20.

The structures between the decorative ring 64 and the cup body 20 are as follows: A third glue-receiving groove is formed on the cup body 20 outside of the first light-transmitting member 61, allowing the decorative ring 64 to fit inside this groove for attachment.

The structure between the pressing plate 62 and the first light-transmitting member 61 is as follows: First, the first light-transmitting member 61 is provided with a protruding ring 611, and within this protruding ring 611, there is an inner mounting portion 613. The pressing plate 62 has a third mounting slot 621 corresponding to the mounting portion 613. The top of the mounting portion 613 is formed with a first glue-receiving groove 614, and the space between the inner side wall of the protruding ring 611 and the outer side wall of the mounting portion 613 forms a second glue-receiving groove 615.

In actual use, the pressing plate 62 is first fitted and secured with glue. The fitting structure involves the mounting portion 613 aligning with the third mounting slot 621. The diameter of the mounting portion 613 can vary along its length, which helps to position and limit the placement of the pressing plate 62. Furthermore, the glue-receiving grooves 614 and 615 ensure adhesion at two points, which enhances the stability of the pressing plate 62 during installation.

The above descriptions and illustrations present the fundamental principles, main features, and advantages of this utility model. The present utility model is not limited to these embodiments. Various modifications and improvements can be made without departing from the spirit and scope of the utility model, all of which should fall within the scope of protection sought by the present utility model.

What is claimed is:

1. A coffee machine, comprising a cup body (20) having a main machine component disposed therein, wherein a mounting bracket (1) is disposed at an end of the cup body (20), the mounting bracket (1) is ring-shaped, and an extraction assembly is mounted on an inner side of the mounting bracket (1); and wherein the extraction assembly comprises a water inlet seat (41) and a base (45), the water inlet seat (41) being a powder tank inlet seat or a capsule tank inlet seat;

an extraction powder tank is formed between the powder tank inlet seat and the base (45), or an extraction capsule tank is formed between the capsule tank inlet seat and the base (45);

a powder tank outer bowl (42) is provided within the extraction powder tank, and a powder bowl (43) is installed inside the powder tank outer bowl (42), when the water inlet seat (41) is a powder tank inlet seat, the water inlet seat (41) covers the powder bowl (43) and cooperates with the powder tank outer bowl (42) to clamp the powder bowl (43); and a rupturing plate (49) is provided within the extraction capsule tank and is arranged on the base (45), when the water inlet seat (41) is a capsule tank inlet seat, the capsule tank inlet seat forms a cavity suitable for a coffee capsule, a piercing needle (446) is disposed on the upper side of the capsule tank inlet seat, and the capsule tank inlet seat cooperates with the base (45) to clamp the edge of the capsule.

2. The coffee machine according to claim 1, further comprising a cup (10) sleeved on the outer side of the mounting bracket (1), a receiving space for accommodating liquid being formed between the cup (10) and the mounting bracket (1), wherein an adjustment component is provided between the mounting bracket (1) and the cup (10) for enlarging or reducing the receiving space.

3. The coffee machine according to claim 2, wherein the adjustment component comprises a slot rail (21) and a first slider (22), wherein the slot rail (21) is disposed on the outer side of the mounting bracket (1), the first slider (22) is disposed on the inner side of the cup (10), and the first slider (22) is located 18 within the slot rail (21) and moves along the slot rail (21) to adjust the position of the cup (10), thereby enlarging or reducing the receiving space; or the slot rail (21) is disposed on the inner side of the cup (10), the first slider (22) is disposed on the outer side of the mounting bracket (1), and the first slider (22) is located within the slot rail (21) and moves along the slot rail (21) to adjust the position of the mounting bracket (1), thereby enlarging or reducing the receiving space.

4. The coffee machine according to claim 3, wherein the slot rail (21) is at least two in number and corresponds one-to-one with the first slider (22), and each slot rail (21) comprises a first transverse section (211), a second transverse section (212), and a connecting section (213) for communicating the first transverse section (211) with the second transverse section (212), such that the first slider (22) can move back and forth between the two transverse sections along the connecting section (213) to enlarge or reduce the receiving space.

5. The coffee machine according to claim 4, wherein the slot rail (21) is disposed on the outer side of the mounting bracket (1), the first slider (22) is disposed on the inner side of the cup (10), a first stopper (241) is provided inside the first transverse section (211), and the first slider (22) is formed with a first engaging slot (221) corresponding to the first stopper (241); and/or an included angle between the lower side of the first transverse section (211) and the connecting section (213) is greater than or equal to 90°; and/or an arc segment is provided between the upper side of the second transverse section (212) and the connecting section (213), and adjacent second transverse sections (212) are not in communication with each other.

6. The coffee machine according to claim 5, wherein the cup (10) is made of a transparent material or a frosted material so as to enable viewing of the adjustment component; and/or a third sealing ring (36) is provided between the mounting bracket (1) and the cup (10), wherein the outer side of the third sealing ring (36) is provided with a notch (361) for venting.

7. The coffee machine according to claim 1, characterized in that: when the water inlet seat (41) is a powder tank inlet seat, a pressing portion (411) is disposed on the outer side of the water inlet seat (41); a plurality of filter holes are formed at the bottom of the powder bowl (43);
    a bottom of the powder bowl (43) is located within the powder tank outer bowl (42), and a first sealing ring (31) is provided between the powder bowl (43) and the powder tank outer bowl (42), wherein the first sealing ring (31) is located outside the plurality of filter holes; and
    a first connecting portion (431) is provided on the outer side of the top of the powder bowl (43) and located between the pressing portion (411) and the top of the powder tank outer bowl (42), and a connecting slot (4311) is formed at the bottom of the first connecting portion (431) corresponding to the top of the powder tank outer bowl (42).

8. The coffee machine according to claim 7, characterized in that the coffee machine further comprises a powder-receiving ring (50), which comprises an abutting portion (501) and a second mounting portion (502) disposed on the outer side of the abutting portion (501);
    a third protrusion (503) is provided on the inner side of the second mounting portion (502)
    a side wall of the first connecting portion (431) outside the connecting slot (4311) acts as a lateral side;
    the bottom of the abutting portion (501) contacts the top surface of the first connecting portion (431), and the top surface of the third protrusion (503) matches the bottom of that lateral side; and/or
    the coffee machine further comprises a folding spoon (60) that includes a spoon body (601) and a spoon handle (602) pivotally connected to the spoon body (601), wherein the spoon body (601) can be placed inside the powder bowl (43) so as to compress coffee powder therein.

9. The coffee machine according to claim 1, characterized in that a first liquid outlet (421) is formed at the bottom of the powder tank outer bowl (42), and a second liquid outlet (451) is formed at the bottom of the base (45) corresponding to the first liquid outlet (421);
    an elastic member (461) is provided between the powder tank outer bowl (42) and the base (45); and
    a first plug (462) is arranged on the elastic member (461) corresponding to the first liquid outlet (421), so that under the action of the elastic member (461), the top of the first plug (462) is positioned within the first liquid outlet (421).

10. The coffee machine according to claim 1, characterized in that a first liquid outlet (421) is formed at the bottom of the powder tank outer bowl (42), and a second liquid outlet (452) is formed at the bottom of the base (45) corresponding to the first liquid outlet (421); and
    a second plug (464) is disposed in the second liquid outlet (452), the second plug (464) being formed with a first slit (4641), wherein the first slit (4641) is in a closed state and opens under force.

11. The coffee machine according to claim 1, characterized in that the mounting bracket (1) is formed with a first passage (11) for water flow, and the water inlet seat (41) is formed with a water inlet (412);
    a first sealing member (35) is provided on the side of the mounting bracket (1) close to the water inlet seat (41);
    the mounting bracket (1) is formed with a first mounting hole (12); and
    the first sealing member (35) forms a sealed structure between the first passage (11) and the water inlet (412) and is used to seal the first mounting hole (12).

12. The coffee machine according to claim 11, characterized in that a latch groove (13) is formed on the outer side of the first passage (11) of the mounting bracket (1);
    the first sealing member (35) is provided with a first latch block (351) corresponding to the first mounting hole (12), and is further provided with a first latching portion (352) corresponding to the latch groove (13);
    the first sealing member (35) is formed with a first through hole (353) corresponding to the first passage (11); and
    a sealing surface is formed at the bottom of the first sealing member (35) that abuts against the water inlet seat (41) and is located outside the water inlet (412), thereby preventing water from leaking outward.

13. The coffee machine according to claim 1, characterized in that the other end of the cup body (20) is provided with a heating area, and the heating area includes a cup main body (82) and a lid (7);
    the lid (7) comprises an outer lid (71) and an inner lid (72) disposed in an opening at the bottom of the outer lid (71);
    a fourth sealing member (73) is arranged between the outer lid (71) and the inner lid (72);
    the inner lid (72) is perforated such that the fourth sealing member (73) is exposed, and the exposed portion of the fourth sealing member (73) is formed with a second slit (731), which opens under force; and
    at least one first vent hole (711) is provided on the top of the outer lid (71), and the first vent hole (711) communicates with the inner side of the fourth sealing member (73).

14. The coffee machine according to claim 1, characterized in that the other end of the cup body (20) is provided with a heating area, and the heating area includes a cup main body (82) and a lid (7);
    an assembly bracket (9) is disposed inside the cup body (20);
    the assembly bracket (9) comprises a support (91) and a first mounting plate (92) disposed on the support (91); and at least two insertion ports (93) are provided on the first mounting plate (92), and at least two first connecting plates (821) are disposed on the outer side of the cup main body (82), with the bottom of each first connecting plate (821) inserted into a corresponding insertion port (93).

15. The coffee machine according to claim 14, characterized in that a fourth protrusion (94) is provided on the inner wall of each insertion port (93), and each first connecting plate (821) is formed with a latch hole (822) corresponding to the fourth protrusion (94).

16. The coffee machine according to claim 1, characterized in that the main machine component comprises a charging assembly (5), which is disposed on one side of the cup body (20) on the same side as the heating area; and
   a waterproof venting member is provided on the cup body (20) for communicating the interior of the cup body (20) with the exterior, thereby allowing gas inside the cup body (20) to be discharged.

17. The coffee machine according to claim 16, characterized in that the waterproof venting member is a waterproof breathable membrane (56).

18. The coffee machine according to claim 17, characterized in that the charging assembly (5) is located on the heating area side and comprises a first circuit board (51), a mounting member (52), and a silicone cover (53);
   the mounting member (52) is installed on the cup body (20);
   the inner and outer sides of the mounting member (52) are connected respectively to the first circuit board (51) and the silicone cover (53);
   a charging connector (54) is arranged on the first circuit board (51);
   an opening is formed in the mounting member (52) such that the charging connector (54) is exposed;
   a second vent hole (55) is formed on the mounting member (52) on the same side as the charging connector (54); and
   the waterproof breathable membrane (56) is disposed on the inner side of the mounting member (52) corresponding to the second vent hole (55).

19. The coffee machine according to claim 1, characterized in that the main machine component comprises a key assembly (6) disposed on one side of the cup body (20);
   a second circuit board (40) is arranged on the interior side of the cup body (20) corresponding to the key assembly (6);
   the key assembly (6) comprises a first light-transmitting member (61) and a pressing plate (62) disposed on the first light-transmitting member (61);
   a button (401) is arranged on the second circuit board (40) corresponding to the pressing plate (62); and
   the first light-transmitting member (61) is elastic and is secondarily injection-molded together with the cup body (20).

* * * * *